United States Patent
Um et al.

(10) Patent No.: US 9,262,730 B2
(45) Date of Patent: Feb. 16, 2016

(54) SYSTEM AND METHOD FOR CONFIGURING DYNAMIC SERVICE NETWORK BASED ON NETSTORE

(75) Inventors: Tai-Won Um, Seoul (KR); Chang-Woo Yoon, Daejeon (KR); Kang-Woon Hong, Seoul (KR); Nam-Kyung Lee, Daejeon (KR); Ho-Yeon Lee, Daejeon (KR); Seung-Hyun Jeon, Daejeon (KR); Hyun-Woo Lee, Daejeon (KR); Won Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 948 days.

(21) Appl. No.: 13/426,557

(22) Filed: Mar. 21, 2012

(65) Prior Publication Data

US 2012/0246319 A1    Sep. 27, 2012

(30) Foreign Application Priority Data

Mar. 22, 2011   (KR) .................. 10-2011-0025419

(51) Int. Cl.
| | |
|---|---|
| G06F 15/173 | (2006.01) |
| G06Q 10/06 | (2012.01) |
| G06F 9/50 | (2006.01) |
| H04L 12/24 | (2006.01) |
| G06Q 50/00 | (2012.01) |
| H04L 29/08 | (2006.01) |

(52) U.S. Cl.
CPC .............. *G06Q 10/06* (2013.01); *G06F 9/5061* (2013.01); *G06Q 50/00* (2013.01); *H04L 41/5054* (2013.01); *H04L 41/0213* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 6,909,708 B1 * | 6/2005 | Krishnaswamy | ..... H04L 65/103 370/352 |
| 7,111,053 B1 * | 9/2006 | Black | .................. H04L 41/0806 709/220 |

(Continued)

FOREIGN PATENT DOCUMENTS

| | | |
|---|---|---|
| KR | 1020100059638 A | 6/2010 |
| KR | 1020100090613 A | 8/2010 |

*Primary Examiner* — Hamza Algibhah
*Assistant Examiner* — James Edwards

(57) ABSTRACT

A dynamic service network creation apparatus includes a resource lookup and registration unit configured to look up and register network resource information of each of a plurality of network resource providers which are managed by a netstore apparatus; and a service network topology configuration unit configured to, in response to a service reservation request being received from each of a plurality of service providers through a service management system, dynamically configure a service network for providing a network-based service from the service provider to a service user that is to use the service of the service provider, wherein the dynamic service network creation apparatus is connected to the service management system that manages the network-based service provided by a plurality of the service providers and the netstore apparatus.

15 Claims, 16 Drawing Sheets

(56) References Cited

U.S. PATENT DOCUMENTS

| | | | | |
|---|---|---|---|---|
| 8,228,861 B1* | 7/2012 | Nix | H04W 36/00 | 370/329 |
| 8,924,526 B1* | 12/2014 | Levy | G06F 15/173 | 709/223 |
| 2002/0133412 A1* | 9/2002 | Oliver | G06Q 30/02 | 705/26.35 |
| 2004/0249927 A1* | 12/2004 | Pezutti | H04L 41/065 | 709/223 |
| 2005/0198247 A1* | 9/2005 | Perry | H04L 7/0008 | 709/223 |
| 2006/0047784 A1* | 3/2006 | Li | H04L 41/046 | 709/220 |
| 2006/0080438 A1* | 4/2006 | Storrie | H04L 67/16 | 709/225 |
| 2007/0118643 A1* | 5/2007 | Mishra | H04L 41/082 | 709/224 |
| 2007/0198663 A1* | 8/2007 | Helander | H04L 41/0806 | 709/220 |
| 2009/0219948 A1* | 9/2009 | Nakajima | H04M 11/002 | 370/463 |
| 2009/0262741 A1* | 10/2009 | Jungck | H04L 29/12066 | 370/392 |
| 2009/0293054 A1* | 11/2009 | Sheehan | H04L 29/06 | 718/1 |
| 2010/0023738 A1* | 1/2010 | Sheehan | G06F 9/455 | 713/1 |
| 2010/0103837 A1* | 4/2010 | Jungck | H04L 29/12066 | 370/252 |
| 2012/0014387 A1* | 1/2012 | Dunbar | H04L 12/4625 | 370/395.53 |
| 2012/0016528 A1* | 1/2012 | Raman | G06F 9/5094 | 700/291 |

* cited by examiner

SYSTEM AND METHOD FOR CONFIGURING DYNAMIC SERVICE NETWORK BASED ON NETSTORE

CROSS-REFERENCE TO RELATED APPLICATION(S)

This application claims the benefit under 35 U.S.C. §119(a) of Korean Patent Application No. 10-2011-0025419, filed on Mar. 22, 2011, in the Korean Intellectual Property Office, the entire disclosure of which is incorporated herein by reference for all purposes.

BACKGROUND

1. Field

The following description relates to a smart device resource management and service transmission control system based on a netstore and a method thereof.

2. Description of the Related Art

Spearheaded by the proliferation of smartphones, personal media environment is following a ubiquity of the smart platforms. Running on an inbuilt CPU and dedicated OS, the platform is increasingly intelligent and personalized, gaining momentum in the communications and broadcasting sector.

A smart TV, as a broadcast and communication convergence media incorporating a central processing unit (CPU), an operating system (OS) and a platform with a TV set, aims to provide an intelligent service beyond the integration of the Internet and broadcasting. In addition, the smart TV receives terrestrial, cable and Internet broadcasts, and simultaneously provides a service being specialized or tailored to the user's needs or conditions, offering Internet access and various applications.

An overlay network is a layer of a virtual network having a service routing function on an existing physical network as a transmission network. That is, the overlay network is a virtual network of nodes and logical links that is built on a top of an existing network. Since nodes in the overlay network are connected by logical links, not physical links, the existing network can be utilized at much as possible, thereby providing more efficient network services. The overlay network topology enhances service performance and efficiency and provides a variety of functions by reconfiguring a logical topology on a top of existing physical and logical topology.

SUMMARY

The following description relates to a technique for allocating and processing content and data through interworking between network functions of smart devices and a cloud server based on a netstore.

In addition, the present invention is to provide a technique for transmitting and processing content and data between smart devices being disposed over multiple domains or is provider networks by allowing a plurality of netstores and a plurality of dynamic service network creation apparatuses, which are present in the respective domains or provider networks, to control and cooperate with each other in a centralized or distributed manner according to a request from a service management system.

In one general aspect, there is provided a dynamic service network creation apparatus including: a resource lookup and registration unit configured to look up and register network resource information of each of a plurality of network resource providers which are managed by a netstore apparatus; and a service network topology configuration unit configured to, in response to a service reservation request being received from each of a plurality of service providers through a service management system, dynamically configure a service network for providing a network-based service from the service provider to a service user that is to use the service of the service provider, wherein the dynamic service network creation apparatus is connected to the service management system that manages the network-based service provided by a plurality of the service providers and the netstore apparatus that is present in each of multiple domains and manages network resources of a plurality of the network resource providers.

In another general aspect, there is provided a netstore apparatus including: a resource registration unit configured to register resource information provided from each of a plurality of network resource providers; a storage unit configured to store the registered network resource information; and a resource management unit configured to, in response to a request for network resource information required for providing a network-based service over a service network from at least one dynamic service network creation apparatus, look up the requested network resource information in the storage unit, provide the found network resource information to the at least one dynamic service network creation apparatus, and issue a resource allocation reservation is request to a plurality of the network resource providers in response to a request for scheduled allocation of at least one network resource for use in providing the network-based service being received from the at least one dynamic service network creation apparatus, wherein the netstore apparatus is connected to a plurality of the network resource providers in a domain, which indicates a service management area, and the at least one dynamic service network creation apparatus which dynamically configures the service network.

In another general aspect, there is provided a smart device including: a control unit configured to operate using a plurality of virtual machines performing an operation for a plurality of netstore apparatuses; and a communication unit configured to communicate with the netstore apparatuses corresponding to the respective virtual machines, wherein the control unit provides at least one network resource information to the netstore apparatus and provides a network resource in response to a request from the netstore apparatus.

In another general aspect, there is provided a method of dynamically configuring a service network of a system which includes a netstore apparatus to have network resources registered and manage the registered network resources, a service management system to have a network-based service registered and manage the registered service, and a dynamic service network creation apparatus to dynamically configure a service network in an overlay networking scheme by using the network resources registered in the netstore apparatus in response to a dynamic service network configuration request from the service management system, the method including: identifying an overall network configuration by receiving network resource information of a domain, which is managed by a local dynamic service network creation apparatus, and topology information about configuration between network resources from the local dynamic service network creation apparatus that dynamically configures a local network in each of multiple domains; in response to a service reservation request from the service is management system, selecting at least one local dynamic service network creation apparatus suitable to dynamically configure a service network according to the service reservation request; and in order to configure the service network, requesting the selected at least one local dynamic service network creation apparatus to configure a local service network in a domain that is managed by the selected local dynamic service network creation apparatus.

In another general aspect, there is provided a method of dynamically configuring a service network of a system which includes a netstore apparatus to have network resources registered and manage the registered network resources, a service management system to have a network-based service registered and manage the registered service, and a dynamic service network creation apparatus to dynamically configure a service network in an overlay networking scheme by using the network resources registered in the netstore apparatus in response to a dynamic service network configuration request from the service management system, the method including: receiving network resource information of a different domain, to which the dynamic service network creation apparatus does not belong, and topology information about configuration between network resources from a different distributed dynamic service network creation apparatus belonging to the different domain; transmitting network resource information of a domain, to which the dynamic service network creation apparatus belongs, and topology information about configuration between network resources to the different distributed dynamic service network creation apparatus; and if a network resource of the different domain is required to configure the service network, requesting the different distributed dynamic service network creation apparatus to dynamically configure a partial service network using the required network resource.

Other features and aspects may be apparent from the following detailed description, the drawings, and the claims.

Figure 1:
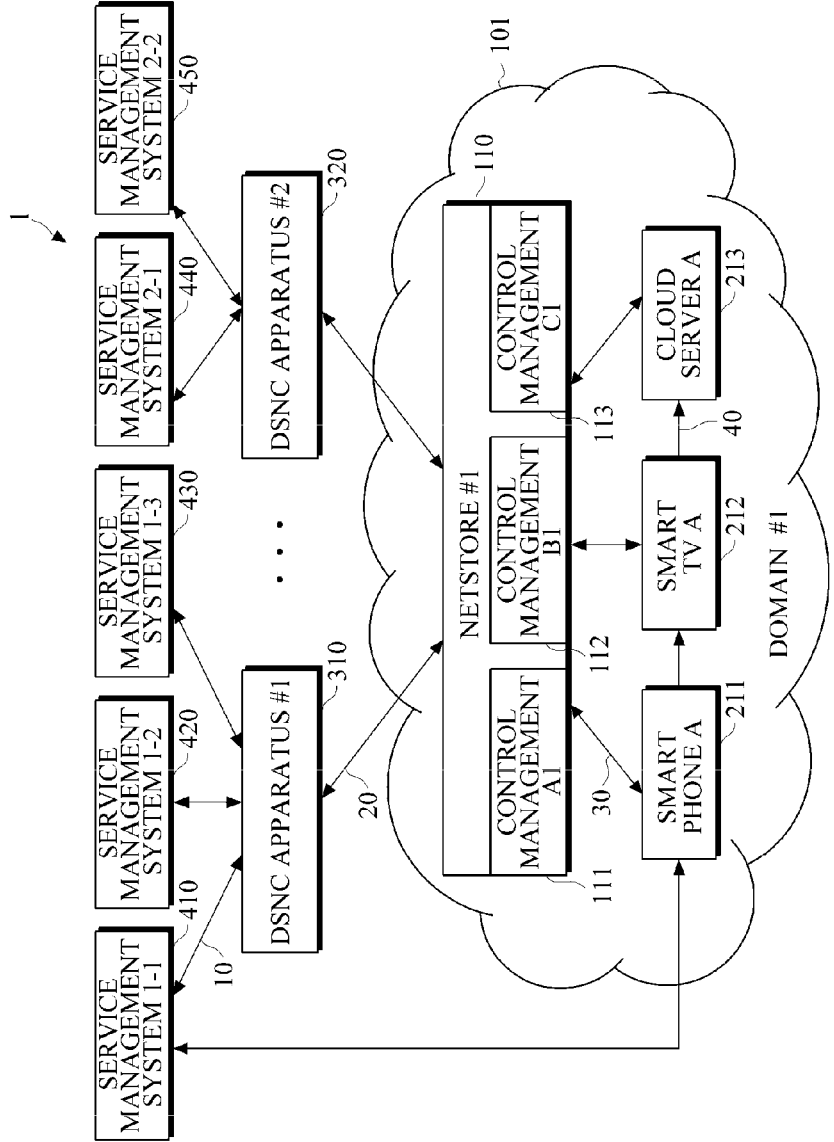
FIG. 1 is a diagram illustrating an example of a system for configuring a dynamic service network in one domain.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of a system for configuring a dynamic service network in one domain.

Referring to FIG. 1, system 1 may include one domain 101, a plurality of dynamic service network creation (DSNC) devices 310 and 320, and a plurality of service management systems 410, 420, 430, 440 and 450.

In the example illustrated in FIG. 1, the domain refers to a region that is managed by a service provider (a communication service provider or a terminal provider) and is the substantially the same as an internet domain, but a netstore provider may configure a domain by grouping geographically close nodes into one domain according to the provider's need. A domain may be divided by organizations and countries. A domain may be referred to as an Internet protocol (IP) subnet.

The system 1 may configure a dynamic service network in response to a service provider's request, and may be operable for the service provider to transmit a service to a service user through the configured service network. The service network refers to an overlay network that is configured over a physical network. A network-based service to be transmitted over the service network may include a variety of services, such as IPTV services, social network services, personal broadcast services, data transmission services, data storage services, data processing services, and the like. In addition, network resources refer to resources required for configuring the service network for providing the network-based service. The network resources may include networking resources, processing resources and storage resources, but it should be appreciated that the type of network resources is not limited thereto.

The domain 101 may include a netstore 110 and a number of smart devices 211, 212, and 213. Each of the smart devices 211, 212, and 213 may have at least one of functions as a service provider to provide a service, a network resource provider to provide a network resource, and a service user to use a service provided by the service provider. The service provider, the network provider, and the service user may be referred to as a transmission node, a core node, and a reception node, respectively.

The smart devices 211, 212, and 213 may be, for example, a smart phone, a smart TV, a personal computer (PC), and the like, and the smart devices may be provided in various shapes and types as long as they function as a service provider, a network resource provider, and a service provider. Thus, in this case, examples of the smart devices 211, 212, and 213 may include a cloud server for use in the provision of a network service.

Smart phone A 211 may be a smart device functioning as a service provider or a is transmission node. The smart device 212 may be a smart TV. The smart device 213 may be a cloud server.

Netstore #1 110 may have network resources registered by a number of the smart devices 211, 212, and 213, which function as network resource providers, and manage the registered network resources. To have resources registered by various smart devices and control the registered resources, the netstore 110 may include a control management function and protocol for supporting a variety of smart devices. Examples of the control management function and protocol may include a simple network management protocol (SNMP), a general switch management protocol (GSMP), a common open policy service (COPS), a simple object access protocol (SOAP), technical report 069 (TR-069), a diameter protocol, etc. For example, control management A1 111 of netstore #1 110 may have network resources registered by smartphone A 211 via a signaling interface 30, and perform control management functions, such as, for example, a request for scheduled allocation of network resources, a request for network resource allocation, and the like.

A number of the smart devices 211, 212, and 213 may use a netstore application to register network resources such as network resources, processing resources, and storage resources, in netstore #1 110. The netstore #1 110 may control and mange the smart devices 211, 212, and 213 to manage the registered network resources. The netstore application refers to a program configured to allow the smart devices 211, 212, and 213, as the network resource providers, to register the network resources in netstore #1 110 and to allow the netstore #1 110 to control and manage the smart devices 211, 212, and 213.

A number of the smart devices 211, 212, and 213 may download the netstore application from an application store or Android® market (not shown) and install it.

The netstore application may be configured to include control management function and is protocol that is suitable to each type of smart device.

For example, netstore #1 110 may upload a netstore application to an app store, the Android® market, or the like, and a user of smartphone A 211 or smart TV A 212 may download the netstore application from the app store, the Android® market, or the like, and install the downloaded application in his/her device. Upon running the netstore application installed in smartphone A 211, the netstore application may communicate with netstore #1 110 present in the network to perform authentication process, and may register the network resources, processing resources and storage resources of the terminal 211 in the netstore.

In this case, each of the smart devices 211, 212, and 213 may register user profile and device profile in the netstore 110. The user profile may include personal information, such as a name, a gender, an address, an age and affiliation of the user of the smart device. The device profile may include a type of the smart device (for example, a smart TV, a smartphone, PC, cloud, etc.), a manufacturer/model name, a geographical location, a name of the smart device, and the like.

The netstore application installed in each of the smart devices 211, 212, and 213 may receive resource allocation request from netstore #1 110, and allocate the resources of the corresponding smart device to transmit and process a specific service (for example, allocate network bandwidth for transmitting streaming data). Netstore #1 110 may monitor the normal operation of the netstore application installed in each of the smart devices 211, 212, and 213 and CPU, memory and network resource utilization rate in each smartphone by regularly communicating with the netstore application.

Besides the netstore application, any applications for use of services that are developed by the service provider may be registered in the app store, the Android® market, or the like. In this case, a service user may be enabled to use the service after downloading and installing the is application in the service user's terminal (a reception node). In addition, the application developed by one service provider may be registered in an app store, and then be installed and used by another service provider. For example, an application for a service, for example, personal broadcasting, may be installed in a terminal of a service provider, that is, a transmission terminal.

A number of the service management systems 410, 420, 430, 440, and 450 may have a network-based service registered by a service provider, for example, smartphone A 211, and manage the registered service. The network-based service may include, for example, real-time streaming, VoD, video conference/call, data transmission, storage service, etc.

In distributing the registered network resources in response to DSNC apparatuses 310 and 320, netstore #1 110 may record in an internal database or cache how much amount of resources of each terminal is scheduled or allocated to which user session of which service management system. Accordingly, resource scheduling can be conducted, which can prevent previously allocated resources from being used again in response to another service request. In addition, in the occurrence of an error in a smart device to which the resource has been allocated through the above procedure, netstore #1 110 may detect a session that is serving a service through the smart device and perform protection recovery for the session.

If there is no available resource in netstore #1 when DSNC apparatus #1 310 issues a request for the provision of a resource to netstore #1 110 in response to a service network configuration request from service management system 1-1 410, DSNC apparatus #1 310 may notify service management system 1-1 410 of a failure of the service network configuration request. Procedures of the smart devices to download a netstore application from an app store, the Android® market, or the like, and register resources in a netstore will be described in detail is later with reference to FIG. 5.

The DSNC apparatuses 310 and 320 may dynamically configure a service network using the resources registered in netstore #1 110. The example illustrated in FIG. 1 shows two DSNC apparatuses 310 and 320, but the system 1 may include only one DSNC apparatus or more than two DSNC apparatuses. Each of DSNC apparatuses may be connected with one or more service management systems via an interface such as a signaling interface 10. In addition, the DSNC apparatus 310 may be connected to netstore #1 110 via a signaling interface 20.

The service management systems 410, 420, 430, 440, and 450 may receive service information from a smart device (for example, smartphone A 211) functioning as a service provider, and manage the received service information. The service information may include, for example, broadcast information if the service is a broadcast service. The service management systems 410, 420, 430, 440, and 450 may be configured by content providers or broadcast providers. In addition, the service management systems 410, 420, 430, 440, and 450 may receive a service use request from a user, and issue a request to the DSNC apparatuses 310 and 320 to configure a service network in response to the service use request.

For example, if smartphone A 211 provides personal broadcast service as a network-based service, the service management system 410 may receive service information associated with the personal broadcasting, for example, broadcast starting time and end time, personal broadcast title, characteristics of content to be broadcast (for example, HD, SD, CIF), information about broadcast transmission node, etc. and may receive a service use request from a service user. In addition, the service management system 410 may manage broadcast programming schedule and issue a request for a necessary service network to the DSNC apparatuses 310 and 320.

The DSNC apparatuses 310 and 320 may configure a service network to provide a is requested service in response to a dynamic service configuration request from each of the service management systems 410, 420, 430, 440, and 450. For example, the dynamic service configuration request may include parameters for dynamic service network creation, which are transmitted from the service management system 410 to DSNC apparatus #1 310. The dynamic service configuration request may include a location of a transmission node, a location of a reception node, information about service target, a service type (for example, real-time streaming, VoD, data transmission, SMS, etc.), content resolution (HD, SD, CIF, etc.) and required quality of service (QoS), and may further include various information if necessary.

For example, in a case in which a real-time personal broadcast provider configures service management system 1-1 410, smartphone A 211 as a service provider may transmit a personal broadcast service request to service management system 1-1 410. In response, the service management system 1-1 410 may transmit a dynamic service configuration request for transmitting the personal broadcasting of smartphone A 211 to DSNC apparatus #1 310 through the interface 10. Then, DSNC apparatus #1 310 may dynamically configure a service network for use in transmitting a service to a reception node (not shown) in response to the received dynamic service network configuration request.

In addition, a VoD service provider, for example, an over-the-top (OTT) service provider, may configure service management system 1-2 420. For example, smartphone A 211 as a service provider may transmit a service reservation request to service management system 1-2 420 to provide a VoD service, and service management system 1-2 420 may request DSNC apparatus #1 310 to dynamically configure a service network for use in transmitting the service according to the service reservation request. In response to the received request, DSNC apparatus #1 310 may dynamically configure a service network for transmitting the service to a reception node (not shown) as a service user.

Moreover, a video conference/call service provider may configure service management system 1-3 430. For example, a smart device, for example, smartphone A 211, as a service provider may transmit a service reservation request to service management system 1-3 430, and service management system 1-3 430 may request DSNC apparatus #1 310 to dynamically configure a service network according to the received service reservation request. In response to the received dynamic service configuration request, DSNC apparatus #1 310 may dynamically configure a service network for use in transmitting a service to a reception node (not shown) as a service user.

Figure 2:
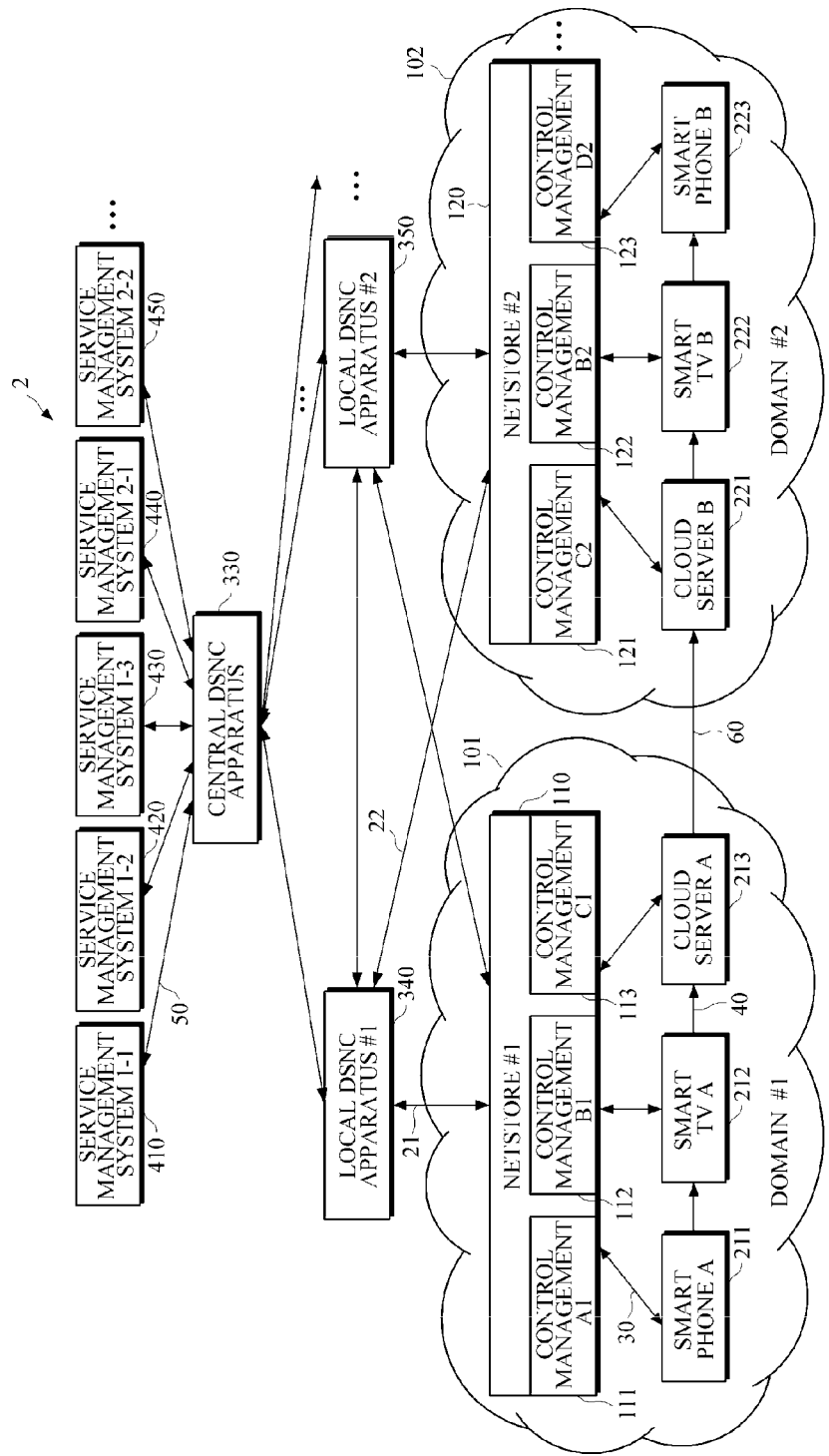
FIG. 2 is a diagram illustrating an example of a system that controls dynamic service network creation (DSNC) apparatuses and netstores in a number of domains in a centralized manner.

FIG. 2 is a diagram illustrating an example of a system that controls DSNC apparatuses and netstores in a number of domains in a centralized manner.

Referring to FIG. 2, system 2 may include two domains 101 and 102, a number of DSNC apparatuses 330, 340, and 350, and a plurality of service management systems 410, 420, 430, 440, and 450. The DSNC apparatuses 330, 340, and 350 may include a central DSNC apparatus 330, and a number of local DSNC apparatuses 340 and 350. In the example illustrated in FIG. 2, there are two local DSNC apparatuses 340 and 350, but it should be appreciated that the number of local DSNC apparatuses may vary.

The local DSNC apparatuses 340 and 350 may register their IP addresses and domain information in the central DSNC apparatus 330 through bootstrapping procedure, etc. In addition, each of the local DSNC apparatuses 340 and 350 may transfer network resource information about the network resource of a network region (or domain) assigned to the local DSNC apparatus and topology information about configuration between network resources to the central DSNC apparatus 330. The central DSNC apparatus 330 may identify the network resources and configuration of the whole network based on the network resource information and topology information received from each of the local DSNC apparatuses 340 and 350.

In this case, the topology information may include connection status information about the connection between smart devices and network nodes (routers, switches, etc.) in a domain assigned by each netstore and performance related information. For example, topology information of domain #1 101 may include the amount of used or remaining processing resources/networking resources/storage resources of smart devices 211, 212, and 213 in domain #1 101 which is registered in the netstore, geographical locations of the smart devices 211, 212, and 213, packet transfer delay time between the smart devices 211, 212, and 213, network bandwidth used in the communication between the smart devices 211, 212, and 213, network connection information of a network router/switch of domain #1 110 and the smart devices 211, 212, and 213, network link connection configuration information of network routers in domain #1 101 and domain #2 102, packet delay time, and the like.

The central DSNC apparatus 330 may centrally receive requests for dynamically configuring a service network from the service management systems 410, 420, 430, 440, and 450. The central DSNC apparatus 330 may analyze the dynamic service network configuration request from each of the service management systems 410, 420, 430, 440, and 450, and select the local DSNC apparatuses 340 and 350 that are suitable to configure a service network according to the dynamic service network configuration request, and issue a request to the local DSNC apparatuses 340 and 350 to dynamically configure a service network to connect local service networks in each of domains 101 and 102 and the domains 101 and 102. In this case, the central DSNC apparatus 330 may select the suitable local DSNC apparatuses 340 and 350 according to a location of the transmission node, a service type (for example, real-time streaming, VoD, data transmission, short message service (SMS), etc.), content resolution (for example, HD, SD, CIF, etc) and required quality of service (QoS).

Figure 3:
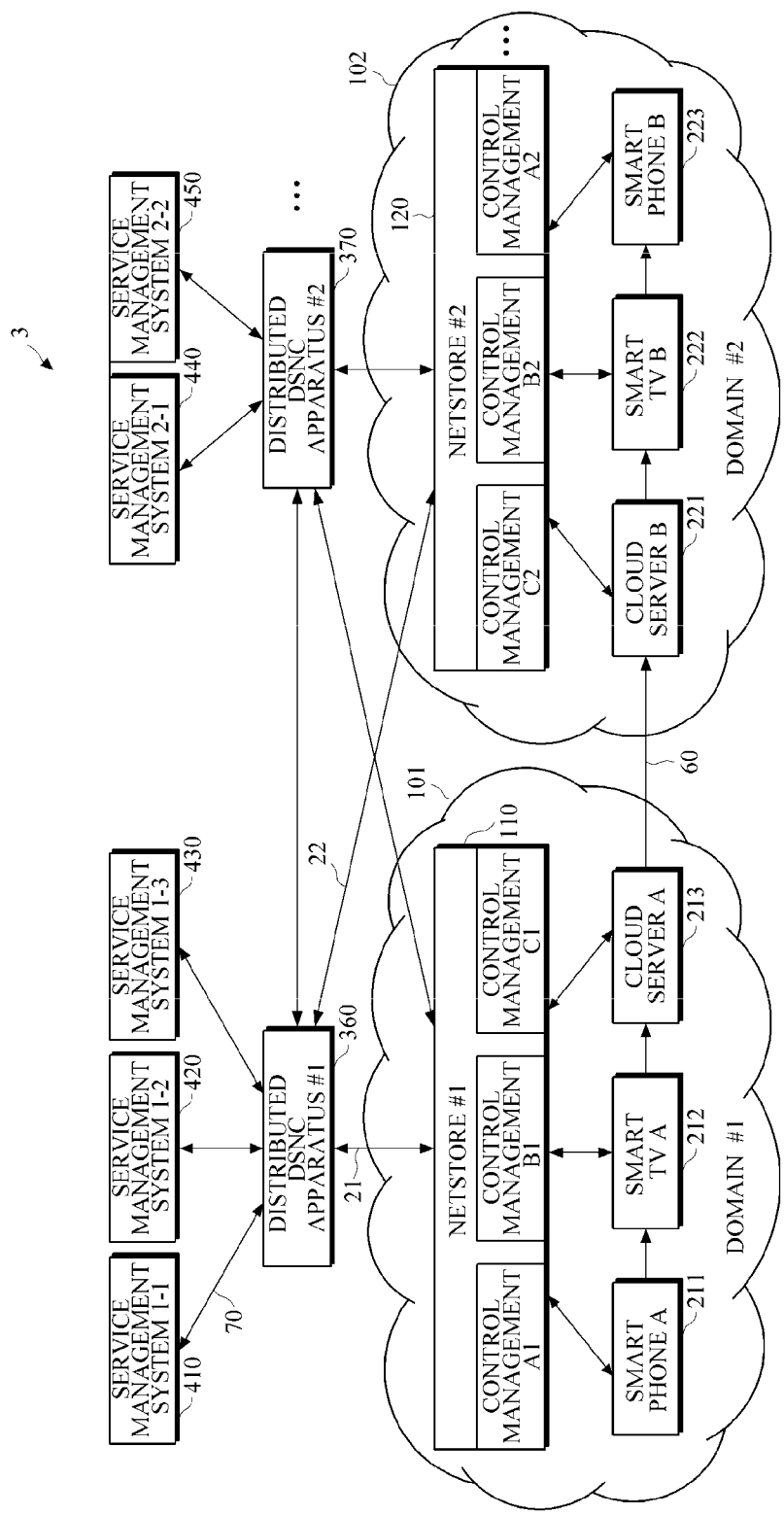
FIG. 3 is a diagram illustrating an example of a system in which DSNC apparatuses coordinate with a netstore in each of a number of domains in a distributed manner.

FIG. 3 is a diagram illustrating an example of a system in which DSNC apparatuses coordinate with a netstore in each of a number of domains in a distributed manner.

Referring to FIG. 3, system 3 may include two domains 101 and 102, a number of DSNC apparatuses 360 and 370, and a number of service management systems 410, 420, 430, 440, and 450.

Each of the DSNC apparatuses 360 and 370 may be a distributed DSNC apparatus that operates in connection with each of netstores 110 and 120. Distributed DSNC apparatus #1 360 may obtain network resource information and topology information from netstore #1 110 which has the information registered therein. Distributed DSNC apparatus #2 370 may obtain resource information and topology information from netstore #2 which has the information registered therein.

After obtaining the resource information and topology information from netstore #1 110, distributed DSNC apparatus #1 360 may perform simplification and abstraction on the detailed resource information and topology in the domain 101 according to policies, and thereafter, flood its own domain information that results from the simplification and abstraction to distributed DSNC apparatus #2 370.

Performing simplification and abstraction on detailed resource information and topology of the domain according to policies may vary with the purposes. For example, in a case in which domain #1 101 and domain #2 102 are provided by different network providers, to exchange information for use in dynamically configuring a service network between distributed DSNC apparatus #1 360 and distributed DSNC apparatus #2 370, distributed DSNC apparatus #1 360 may provide distributed DSNC apparatus #2 370 and other DSNC apparatuses with some specifications (for example, bandwidth) of a representative smart device or routers that are is belonging to domain #1 and connected to an external network such as domain #2 102 and network connection information. Accordingly, distributed DSNC apparatus #1 360 may prevent detailed information of smart devices and network topology information of domain #1 110 from being disclosed to all service providers in domain #2 120.

As shown in FIG. 3, in configuring a service network to traverse domain #1 101 and domain #2 102, each of distributed DSNC apparatus #1 360 and distributed DSNC apparatus #2 370 may disclose information required for establishing a connection between cloud server 213 and cloud server B 221 to other DSNC apparatuses. A local service network configuration in each domain, for example, smartphone A 211->smart TV A 212->cloud server A 213, may be processed by a corresponding domain service provider, and thus a service network that traverses multiple domains can be configured without a need for disclosing detailed information to other domain service providers. A result of simplifying and abstracting detailed resource information and topology of each domain may be referred to as domain information.

The distributed DSNC apparatuses 360 and 370 may regularly update the domain information of each domain. In addition, the distributed DSNC apparatuses 360 and 370 may flood the domain information to other DSNC apparatuses, and each of the DSNC apparatuses 360 and 370 may achieve domain information flooded from other DSNC apparatuses and collect the information, thereby enabling to identify the overall network configuration.

In response to a dynamic service network configuration request from service management system 1-1 410, distributed DSNC apparatus #1 360 may analyze the received request and then attempt to dynamically configure a service network by requesting netstore #1 110 in the same domain. In addition, if necessary, distributed DSNC apparatus #1 360 may transmit a dynamic service network configuration request to another distributed DSNC apparatus #2 370 so as to configure a service network that traverses multiple domains. For example, if is service management system 1-1 410 requests distributed DSNC apparatus #1 to configured a service network that traverses domain #1 101 and domain #2 102, distributed DSNC apparatus #1 360 may transmit the dynamic service network creation request to distributed DSNC apparatus #2 370 so as to configure the service network in domain #2 102.

More specifically, distributed DSNC apparatus #1 360 in domain #1 101 may obtain topology information and network resource information of domain #2 102 through topology/resource information flooding with distributed DSNC apparatus #2 370 in domain #2 102. When receiving the dynamic service network configuration request from service management system 1-1 410, if it is confirmed that a service receiving node is located in domain #2 102, distributed DSNC apparatus #1 360 may issue a request for resource information for use in dynamically configuring a service network in domain #1 101 through netstore #1 110, and at the same time, request distributed DSNC apparatus #2 370 to configured a partial service network in domain #2 102 by transmitting the dynamic service network configuration request to distributed DSNC apparatus #2 370.

The dynamic service network configuration request received by distributed DSNC apparatus #1 360 from service management system 1-1 410 is information for requesting configuring a service network that traverses domain #1 101 and domain #2 102, whereas the dynamic service network configuration request transmitted from distributed DSNC apparatus #1 360 to distributed DSNC apparatus #2 370 may be information to request configuring only a partial service network in domain #2 102. Although only two domains are illustrated in FIG. 3, a service network that traverses domain #2, domain #3, and up to domain $4 may be configured by transmitting a dynamic service network configuration request to each of subsequent DSNC apparatuses to request configuring a partial service network in a corresponding domain.

Figure 4:
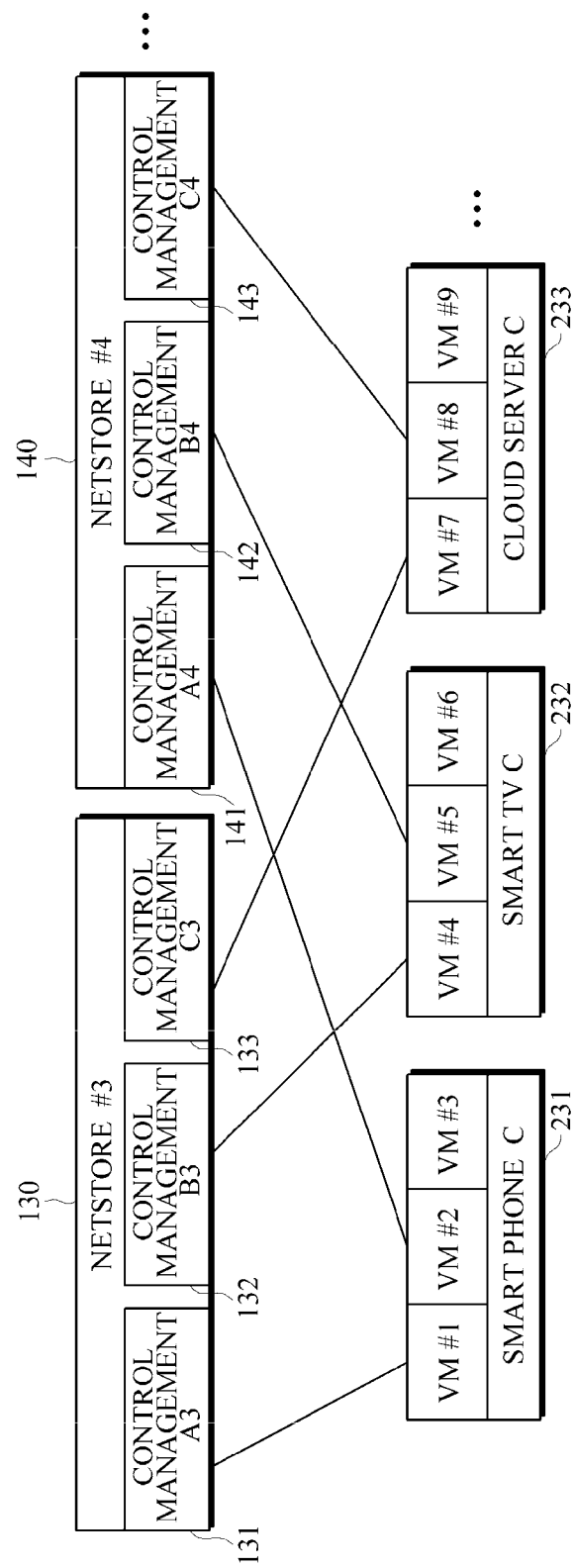
FIG. 4 is a diagram illustrating an example of a system in which a network resource provider is controlled by multiple netstores.

FIG. 4 is a diagram illustrating an example of a system in which a network resource is provider is controlled by multiple netstores.

Smart devices such as smart TV C 231, smartphone C 232, and cloud server C 233 may be registered in one netstore and be used in resource management and allocation. However, as shown in the example illustrated in FIG. 4, each of smart devices such as smart TV C 231, smartphone C 232, and cloud server C 233 may be configured to include multiple virtual machines and have each virtual machine registered in each of different netstores. The multiple virtual machines may be configured to operate in association with a corresponding netstore. In addition, each of the multiple virtual machines may be configured to perform network resource allocation.

Each of the smart devices may include a control unit (not shown) to control the overall operation of the device and a communication unit (not shown) for the communication with an external network device such as a system management device. The multiple virtual machines that operate in one smart device may be installed in the control unit of the smart device.

As described above, a protocol for supporting the communication with a netstore may vary according to type of the smart device. For example, the protocols may be SNMP, GSMP, COPS, SOAP, TR-069, diameter, etc. For example, control management A3 131 of netstore #3 130 may be an interface module that operates according to a protocol for use in the communication with smartphone C 231, and control management B3 132 may be an interface module that operates according to a protocol for use in the communication with smart TV C 232.

To register a smart device 231, 232, or 233, the smart device 231, 232, or 233 may register a user profile that includes personal information of a user of the smart device, such as a name, a gender, an address, an age and affiliation of the user, in the netstores 130 and 140. In addition, each of the smart devices 231, 232, and 233 may register its device profile, which is includes a type of the smart device (for example, a smart TV, a smartphone, a PC, a cloud, and the like), a manufacturer/model name of the smart device, a geographical location of the smart device, a name of the smart device, an identifier of a virtual machine for association with each netstore, and the like, in the netstores 130 and 140.

The smart devices 231, 232, and 233 that operate as multiple virtual machines may be used as nodes in two or more service networks. For example, smart TV C 232 may be able to transfer not only personal broadcast data from transmission node A but also personal broadcast data from transmission node B in a parallel manner.

At this time, an increase in the amount of data being transmitted from transmission node A via smart TV C 232 may cause loss or delay of data being transmitted from transmission node B via smart TV C 232. However, if smart TV C 232 has a virtual machine function, smart TV C 232 can be allocated bandwidth of network resources that is available to each VM. Accordingly, for example, VM #4 of smart TV C 232 having the transmission capacity of 10 Mbps may be allocated to transmission node A to process data, and VM #5 having the transmission capacity of 20 Mbps may be allocated to transmission node B for data transmission and process data. By doing so, when data traffic with respect to transmission node soars, only 10 Mbps that is allocated to VM #4 may be used and 20 Mbps of VM #5 used by transmission node B may not be affected.

Figure 5:
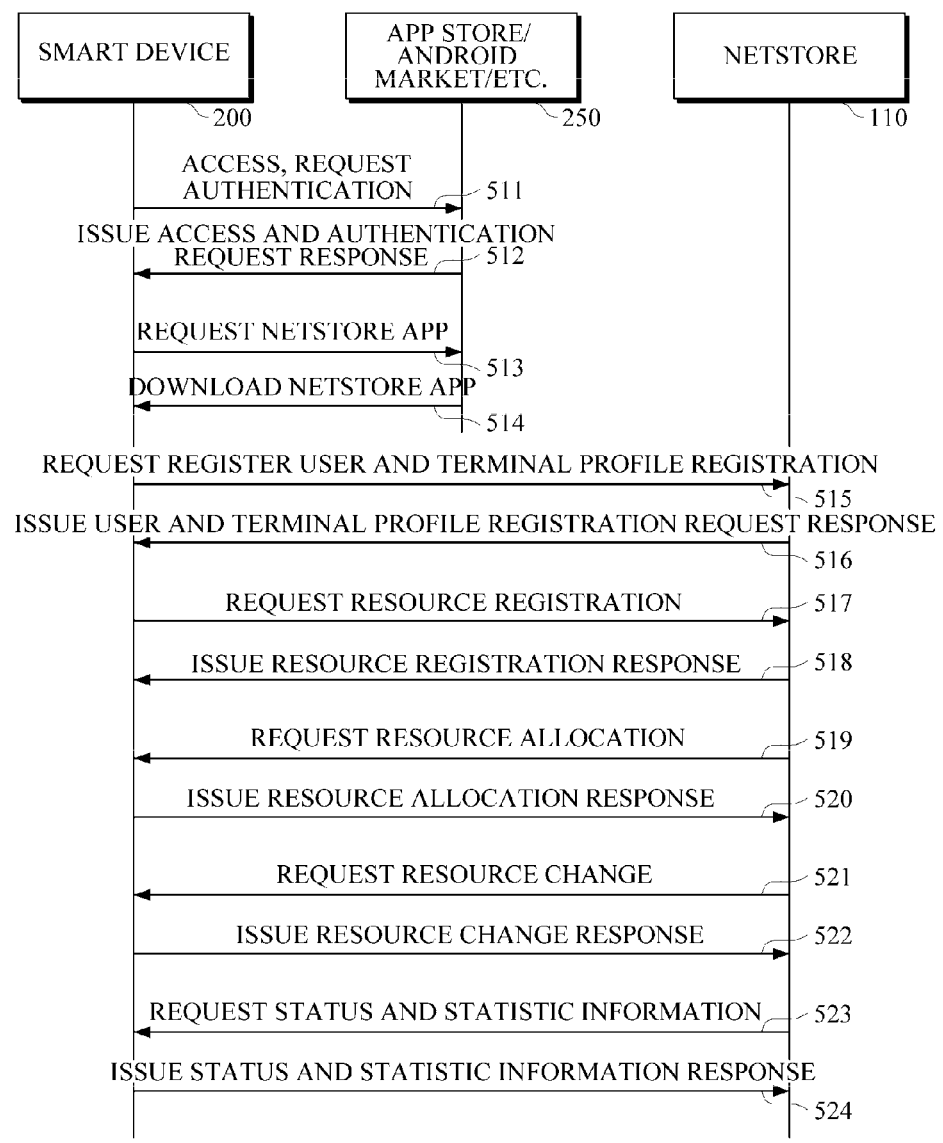
FIG. 5 is a diagram illustrating an example of procedures of smart devices downloading netstore applications from an application store or Android® market and registering resources in the netstore.

FIG. 5 is a diagram illustrating an example of procedures of smart devices downloading netstore applications from an application store or Android® market and registering resources in the netstore.

Referring to FIG. 5, a smart device 200 may be a network node that serves as a network resource provider, such as a smart device, including a smart phone and a smart TV and a cloud server. A netstore 250 may be provided by a terminal manufacturer or a platform provider, and is may be Android® market or any smart TV market. In FIG. 5, the netstore has the same numeral reference as netstore #1 110 shown in FIGS. 1 to 3, but it refers to all netstores that register and manage network resources on a network.

To register and use resources of the smart device 200, the smart device 200 may access the app store 250 to request authentication (511), and receive a response to an authentication request from the app store 250 (512). The smart device 200 may request the app store 250 for a netstore application (513), and download the netstore application from the app store 250 and install it (514). At this time, the app store 250 may analyze a type of the smart device 200, select a netstore application that has a control management function and protocol which is suitable to the smart device 200, and allow the smart device 200 to download the selected netstore application.

The smart device 200 may run the netstore application to access the netstore 110, request the netstore 110 to register user and terminal profiles (515), and receive a response to the request from the netstore 110 (516).

In addition, the smart device 200 may request the netstore 110 to register resources (517), and receive a response to the resource registration from the netstore 110 (518). Moreover, the smart device 200 may receive a resource allocation request from the netstore 110 (519), and transmit a resource allocation response to the netstore 110 to allocate a requested resource (520). In operation 520, the smart device 200 may transmit the resource allocation response to distribute processing, storage and networking resources, which are required to process a specific service session, to the netstore 110.

Further, if the currently allocated resources are not needed any longer or other resources are required, the netstore 310 may transmit a resource change request to the smart device 200 is (521), and in response, the smart device 200 may allocate resources changed according to the resource change request (522).

Further, the netstore 310 may request the smart device 200 to send resource usage status and static information (523), and in response, the smart device 200 may report the resource usage status and static information to the netstore 250 (524). The netstore 250 may monitor a status of the allocated network resources by regularly issuing a request for the resource usage status and static information to the smart device 200.

Figure 6A:
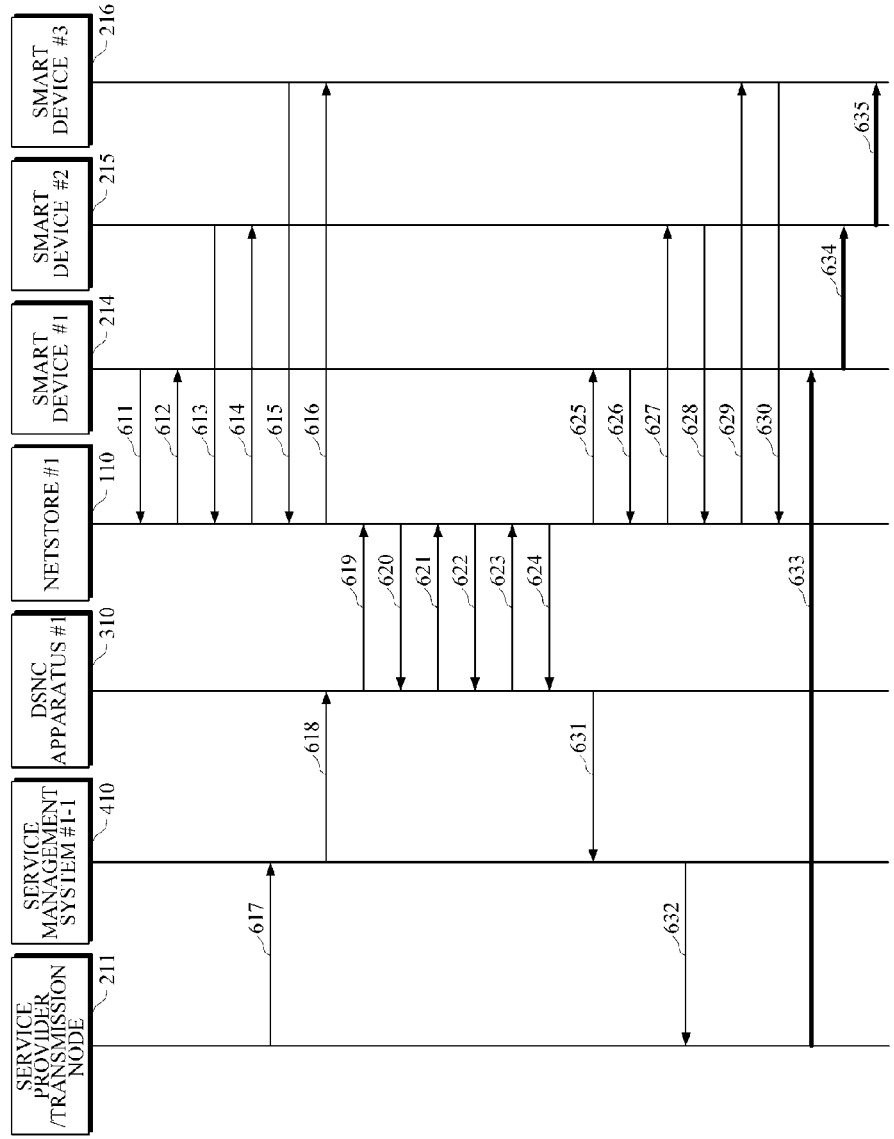
FIGS. 6A to 6C are diagrams illustrating an example of procedures of smart devices registering resources and distributing resources according to a service request in a single domain.
Figure 6B:
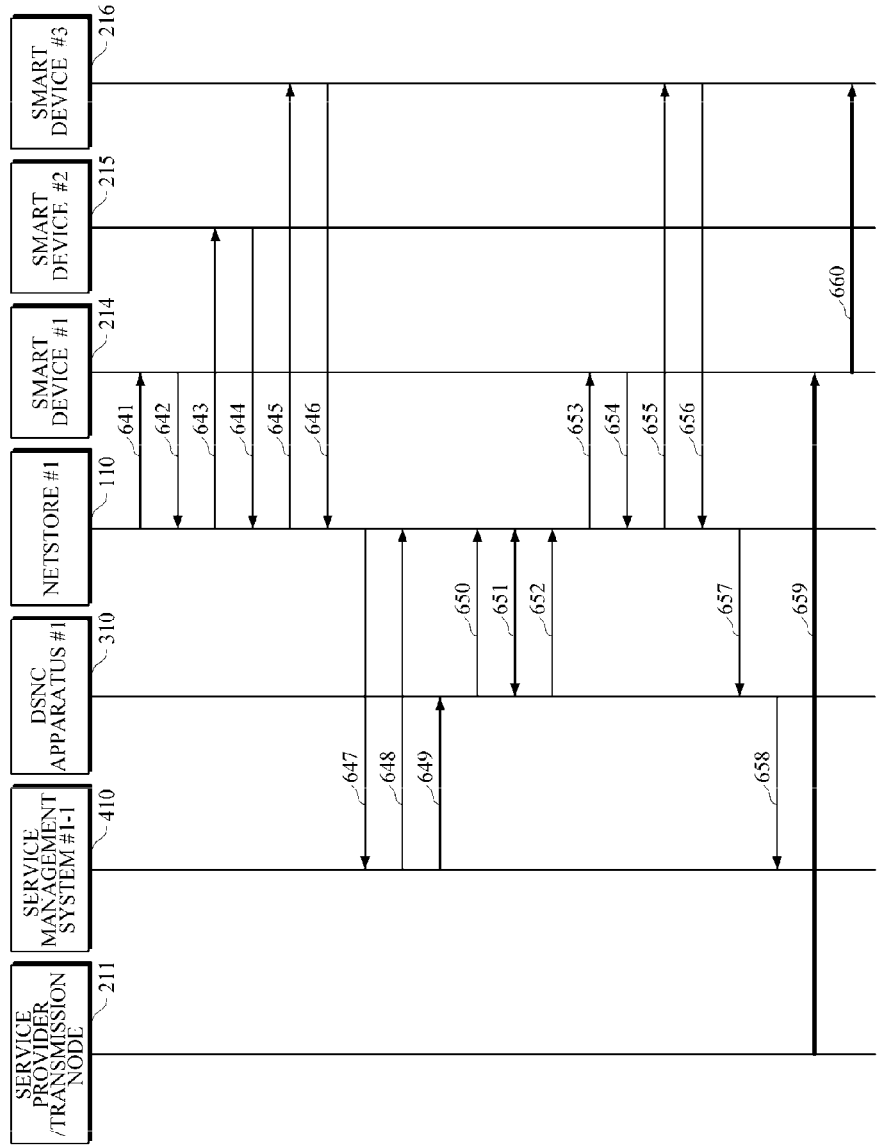
Figure 6C:
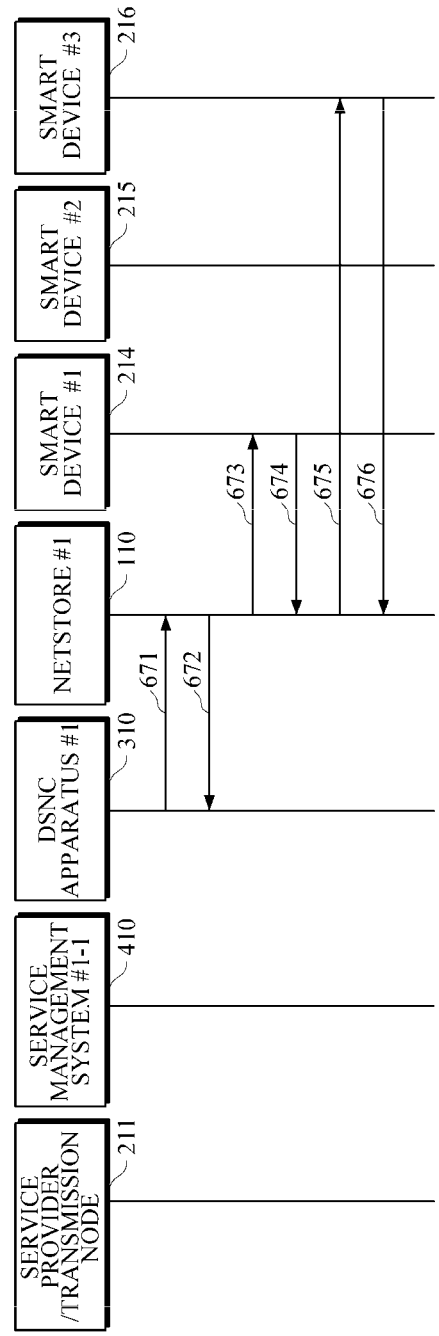

FIGS. 6A to 6C are diagrams illustrating an example of procedures of smart devices registering resources and distributing resources according to a service request in a single domain.

Smart device #1 214, smart device #2 215 and smart device #3 216 may perform resource registration in netstore #1 110 as smartphone A 211, smart TV A 212 and cloud server A 213 shown in FIG. 1 do. For the resource registration, smart device #1 214 may request netstore #1 110 to register resources (611), and netstore #1 110 may respond to the resource registration (612). Smart device #2 215 may request netstore #1 110 to register resources (613), and netstore #1 110 may respond to the resource registration (614). Smart device #3 216 may request netstore #1 110 to register resources (615), and netstore #1 110 may respond to the resource registration (616).

Under the assumption that a transmission node as a service provider is smartphone A 211 like in FIG. 1, the service provider 211 may request a service management system #1-1 for scheduled service registration for serving a service at a pre-set time, such as a real-time streaming service (617). Then, service management system #1-1 410 may transmit a dynamic network configuration request for requesting service network configuration to DSNC apparatus #1 310 in response to the service reservation request (619).

The dynamic network configuration request may include a message for requesting network configuration for use in providing service reservation information and the relevant service. The service reservation information may include a location of a transmission node, a type of a reception node (for example, a smartphone, a smart TV, a PC, and the like), service start time and end time, a type of service (for example, a real-time streaming service, a VoD data service, SMS, and the like), content resolution (for example, HD, SD, CIF, and the like) and required QoS.

DSNC apparatus #1 310 may issue a resource information request to netstore #1 (619), receive a resource information response from netstore #1 110, thereby identifying network resources that are necessary for configuring a service network. Operations 619 and 620 may be performed prior to receiving the dynamic network configuration request from service management system #1-1.

DSNC apparatus #1 310 may transmit a request to netstore #1 110 for network resources that are required for dynamic network configuration (621). In response to a resource reservation request being received, netstore #1 110 may check whether there are available resources, and in the lack of available resources, notify DSNC apparatus #1 310 of a failure of resource reservation (622).

In response to receiving the notification of failure of resource reservation, DSNC apparatus #1 111 may modify resource reservation information, and retry a resource reservation request to netstore #1 110 (623). Netstore #1 110 may accept the resource reservation request once the presence of available resources is confirmed (624). In addition, at about a time when the resources start to be used, netstore #1 110 may request a corresponding smart device 214, 215, and 216 to allocate resources (625, 627, and 629), and in response, the smart devices 214, 215, and 216 may transmit a resource allocation response to netstore #1 110 (626, 628, and is 630).

In response to a resource reservation request being successful through netstore #1 110, DSNC apparatus #1 310 may transmit a dynamic network configuration response message to service management system #1-1 410 to notify of successful allocation of the network resources that constitute a service network (631).

The dynamic network configuration response message may include information regarding a network provider which constitutes a service network and result code by the dynamic network configuration request transmitted from service management system #1-1 110 to DSNC apparatus #1 310. For example, if a result code value is '1,' it indicates success of the dynamic network configuration request, and on the other hand, if a result code value is '2,' it indicates failure of the dynamic network configuration request. In addition, code values (for example, 2, 3, 4, 5, . . .) may be defined for use by service management system #1-1 110 and DSNC apparatus #1 310.

After receiving the dynamic network configuration response message, service management system #1-1 410 may notify smartphone A 211 as a service provider that the scheduled service registration has been successfully complete (632). Smartphone A 211 may transmit content, data, or the like through the service network generated at a pre-set time, that is, a network established among smart device #1 214 that provides the network resources, smart device #2 215, and smart device #3 216 (633, 634, and 635). To this end, in operations 625, 627, and 629 for distributing resources, information about a previous node from which each of the smart devices 214, 215, and 216 receives content and data for a network-based service and information about a next node to which the each of the smart devices 214, 215, and 216 transmits a result of processing the received content and data may be transferred.

Although not illustrated, a service provided by the service provider 211 may be is transmitted to a smart device as a service user connected to smart device #3 216.

FIG. 6B is a diagram illustrating an example of procedures of reconfiguring a network while a service is offered through a service network configured through the procedures as shown in FIG. 6A.

Netstore #1 110 may periodically transmit a status and statistic information request message to each of the smart devices 214, 215, and 216 (641, 643, and 645) and receive a status and statistic information response from each of the smart devices 214, 215, and 216 (642, 644, and 646). Through these operations, netstore #1 110 monitors a usage state of each of the smart devices 214, 215, and 216 regarding a CPU, memory, and a network interface and detects the presence of any error or malfunction within the smart device.

If there is no response to the state and statistic information request from one smart device (for example, smart device #2 215), netstore #1 110 may send the same request to the smart device one or more times, and if smart device #2 215 remains unresponsive, it may be determined that smart device #2 215 is turned off or has errors on it. In this example, netstore #1 110 may identify service sessions transmitted through the smart device 215, and transmit an error notification message to service management system #1-1 410 through DSNC apparatus #1 310 that manages the service session (647). In response to the error notification message, service management system #1-1 410 may transmit an acknowledgement of the message to netstore #1 110 through DSNC apparatus #1 310 (648).

In response to the error notification message (647), service management system #1-1 410 delivers a network recreation request (649). Then, DSNC apparatus #1 310 re-requests netstore #1-1 410 to transmit resource information (650), and receives a response to the request for the resource information (650). Through these operations, it is possible to identify available resources.

DSNC apparatus #1 310 requests netstore #1 110 to allocate resources in accordance with the available resources, and in response to the request, netstore #1 110 requests the smart devices 214 and 216, to which the resources have been previously allocated, to change the resources (653 and 655), and receives responses to the request from the smart devices 214 and 216 (654 and 656). Alternatively, netstore #1 110 may request a new smart device, which has not been ever used, to allocate a network, and receive a new network resource.

When changed resource allocation is successful, netstore #1 220 transmits to DSNC apparatus #1 310 a changed resource allocation response to notify the success of changed resource allocation (657), and DSNC apparatus #1 310 transmits the network recreation response message to service management system #1-1 410 (658). Through these operations, the service information containing the contents or data may be transmitted from the service provider 211 over the reconfigured service network (659 and 660).

FIG. 6C is a diagram illustrating an example of procedures of network service termination.

At a service termination time, DSNC apparatus #1 310 transmits a resource release request to netstore #1 110 (671), and receives an acknowledgement of the resource release request from netstore #1 110 (672). Netstore #1 110 requests each of the smart devices 214 and 216, which function as providers of network resources that configures the service network, to release the allocated resources (673 and 675), and receives a resource release response from each of the smart devices 214 and 216, which notifies the release of the allocated resources (674 and 676).

Figure 7A:
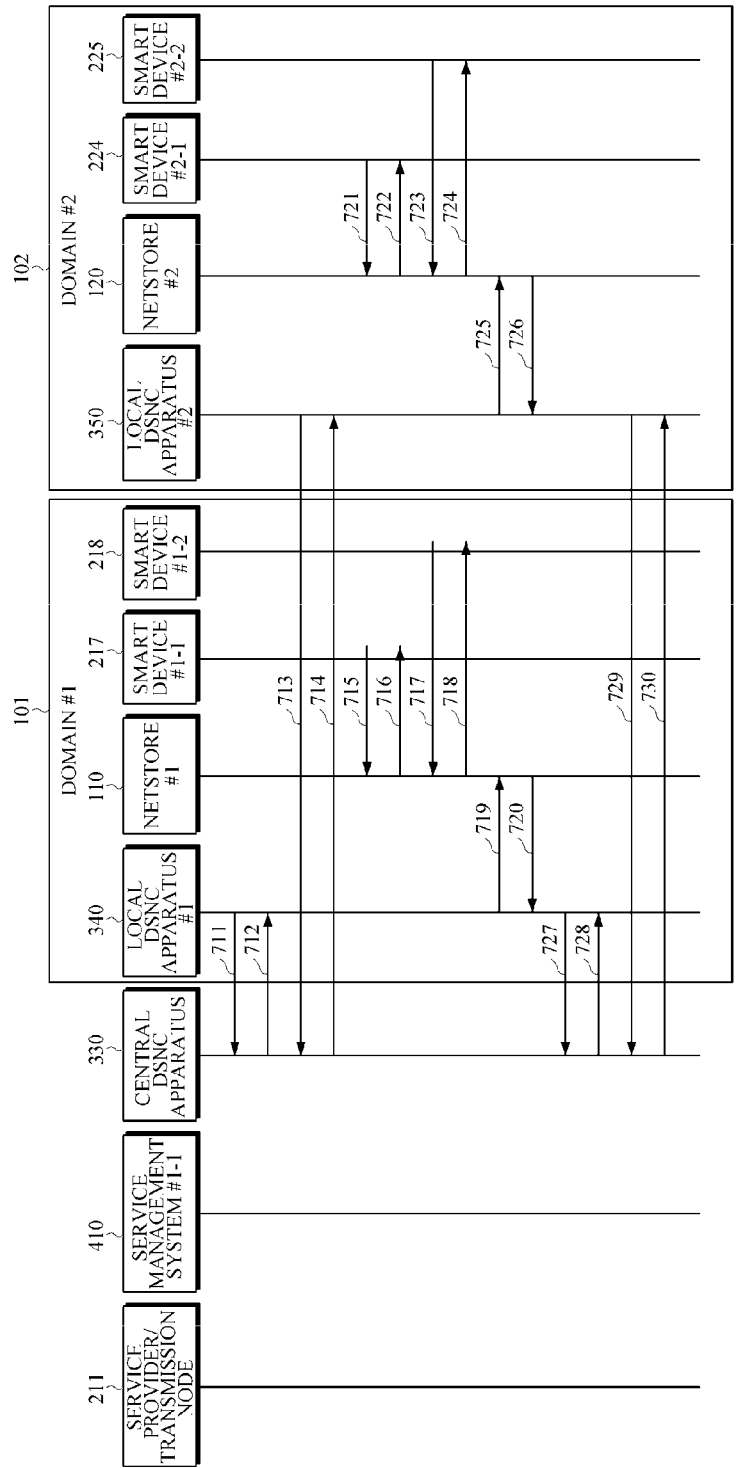
FIGS. 7A and 7B are diagrams illustrating an example of procedures of controlling DSNC apparatuses and netstores in a number of domains using a centralized scheme.
Figure 7B:
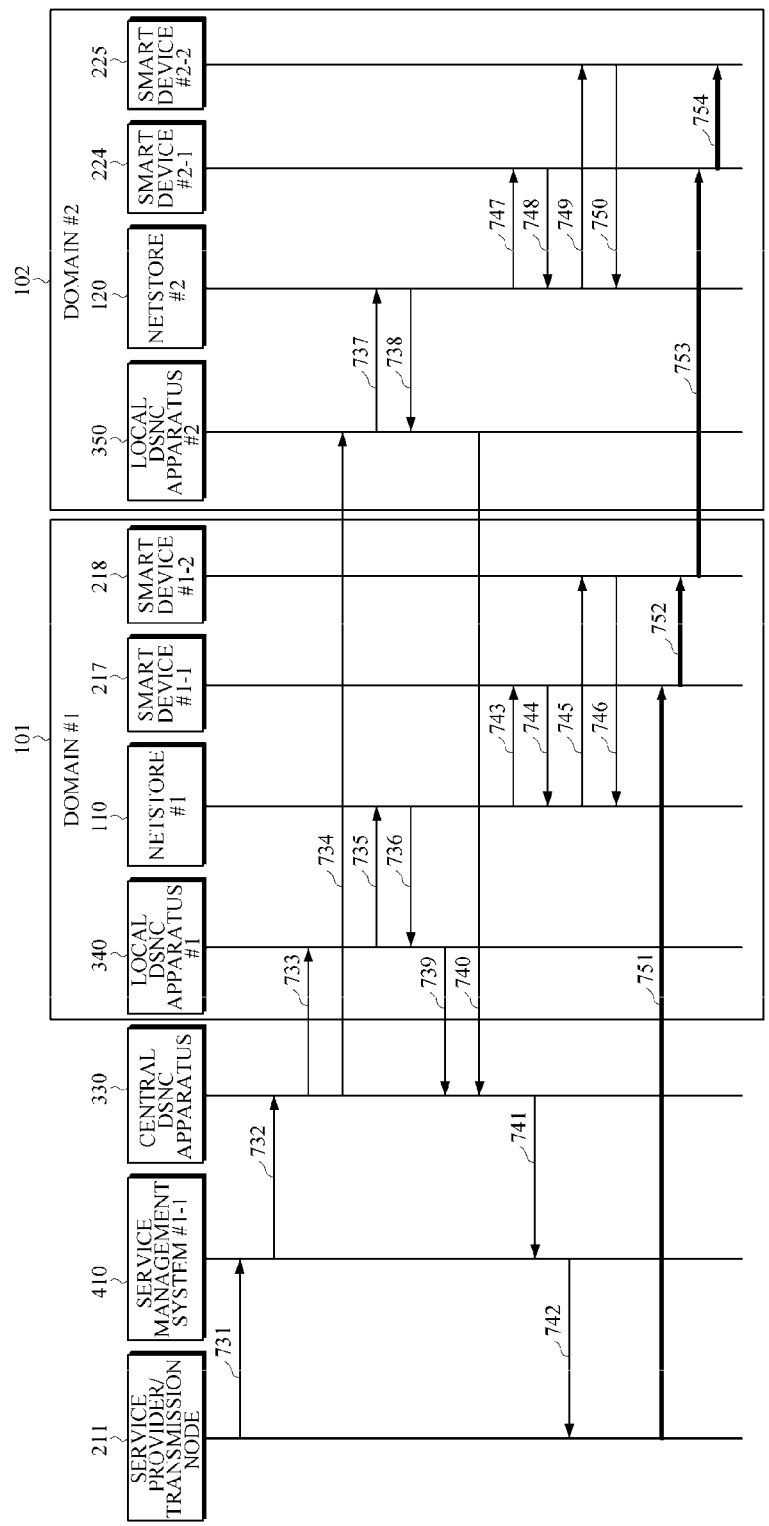

FIGS. 7A and 7B are diagrams illustrating an example of procedures of controlling DSNC apparatuses and netstores in a number of domains using a centralized scheme.

In FIGS. 7A and 7B, as shown in FIG. 2, service management systems including service is management system #1-1 410 are connected to a central DSNC apparatus 330. FIG. 7A illustrates procedures of the central DSNC apparatus 330 collecting topology information and network resource information of the entire network.

In each domain or subnet, local DSNC apparatuses 340 and 350 are present. Domain #1 101 includes local DSNC apparatus #1 340, netstore #1 110, smart device #1-1 217, and smart device #1-2 218. Domain #2 102 includes local DSNC apparatus #2 350, netstore #2 120, smart device #2-1 224, and smart device #2-2 224. Smart device #1-1 217 and smart device #1-2 218 act as network resource provider in domain #1, and smart device #2-1 224 and smart device #2-2 225 act as network resource providers in domain #2.

The local DSNC apparatuses 340 and 350 register their IP addresses and domain information to the central DSNC apparatus 330 (711 and 713), and the central DSNC apparatus 330 may acknowledge the registration (712 and 714).

The smart devices 217 and 218 in the domain #1 101 requests netstore #1 110 to register resources (715 and 717), and in response to the request, the requested resource information is registered in netstore #1 110. Then, netstore #1 110 transmits a response to the smart devices 217 and 218 to notify the registration of the resource information (716 and 718). In addition, the smart devices 224 and 225 in domain #2 102 request netstore #2 120 to register resources (721 and 723), and in response to the request, the requested resource information is registered in netstore #2 120. Accordingly, netstore #2 120 transmits a response to the smart devices 224 and 225 to notify the registration of the resource information (722 and 724).

Local DSNC apparatus #1 340 regularly transmits a resource information request message to netstore #1 110 in domain #1 101 (719), and receives a response to the resource information request message from netstore #1 110, thereby achieving information about is available resources and topology information (720). In addition, local DSNC apparatus #2 350 regularly transmits a resource information request message to netstore #2 120 in domain #2 102 (725), and receives a response to the resource information request message from netstore #2 120 (726).

Network resource information and the topology information of the smart devices 217 and 218 belonging to domain #1 101 are generated by processing, for example, simplifying and abstracting, the achieved information according to policies of local DSNC apparatus #1 340. Local DSNC apparatus #1 340 transmits the generated network resource information and topology information to the central DSNC apparatus 330 (727). Then, the central DSNC apparatus 330 may acknowledge the receipt of the information (728). Similarly to local DSNC apparatus #1 340, local DSNC apparatus #2 350 transmits to the central DSNC apparatus 330 network resource information and topology information of the devices 224 and 225 belonging to domain #2 102 (729), and receives an acknowledgement of the receipt of the information from the central DSNC apparatus 330 (730).

FIG. 7B illustrates procedures of configuring a service network using the central DSNC apparatus 330.

The central DSCN device 330 stores and manages the topology information and resource information transmitted from the local DSNC apparatuses 340 and 350. In addition, when service management system #1-1 410 transmits a dynamic service network configuration request (732) in response to a scheduled service registration request from the transmission node 211 (731), the central DSCN device 330 analyzes the dynamic service network configuration request so as to select appropriate domains 101 and 102, and transmits dynamic partial network configuration request to the local DSNC apparatuses 340 and 350 in the selected domain 101 (733 and 734).

The example shown in FIG. 7B assumes that the transmission node 211 is present in domain #1 101 and a reception node (not shown) is present in domain #3 (not shown), that is, the transmission node 211 and the reception node are present in different nodes, and that domain #1 101 and domain #3 are not directly connected to each other and they can be connected via domain #2 102. In this example, a service network from the transmission node 211 to the reception node may be formed as traversing domain #1, domain #2, and domain #3 in this order. The central DSNC apparatus 330 may select domains #1, #2, and #3, and request dynamic local network configuration through each of the local DSNC apparatuses 340 and 350. If there are two or more reception nodes 2 placed in different domains, more domains than the above example may be selected.

Local DSNC apparatus #1 340 may analyze the dynamic partial network configuration request received from the central DSNC apparatus 330, then, request scheduled resource allocation through netstore #1 110 in domain #1 101 (735), and receive a response to the request (738).

Local DSNC apparatus #1 340 may configure a local network for providing a service within domain #1 101 by using the information of network resources being scheduled to be allocated. In addition, the local DSNC apparatus #1 340 may transmit to the central DSNC apparatus 330 a dynamic configuration response with respect to a partial network (739). Moreover, local DSNC apparatus #2 350 may also configure a local network for providing a service within domain #2 by using the information of network resources being scheduled to be allocated, and transmit a dynamic network configuration response to the central DSNC apparatus 330 (740). The dynamic configuration response with respect to a partial network may include router information for use in connection with other domains.

In response to receiving a scheduled resource allocation request from local DSNC is apparatus #1 340 and local DSNC apparatus #2 350 (739 and 740), the central DSNC apparatus 330 transmits to service management system #1-1 410 a dynamic network configuration response with respect to a service network traversing domain #1 101 and domain #2 102 (741), and service management system #1-1 410 transmits a service reservation registration response to the service provider 211 (742).

Netstore #1 110 may request smart device #1-1 217 and smart device #1-2 218 to allocate resources at a time scheduled for the resource allocation (743 and 745), and receive a resource allocation response from each of smart device #1-1 217 and smart device #1-2 218 (744 and 746). In addition, netstore #2 120 may request smart device #2-1 224 and smart device #2-2 225 at a time scheduler for the resource allocation (747 and 749), and receive a resource allocation response from each of smart device #2-1 224 and smart device #2-2 225 (748 and 750).

At a scheduled service time, the service provider 211 transmits service data to the reception node (not shown) through the smart devices 217 and 218 included in a local service network of domain #1 101 and the smart devices 224 and 225 included in the local service network in domain #2 102 (751, 752, 753 and 754).

When the service is terminated, in response to a request from the central DSNC apparatus or information reserved in each local DSNC apparatus, the resources allocated in the domain is released. The resource release through the netstore in each domain may be performed in the same manner as in the example illustrated in FIG. 6C.

Figure 8A:
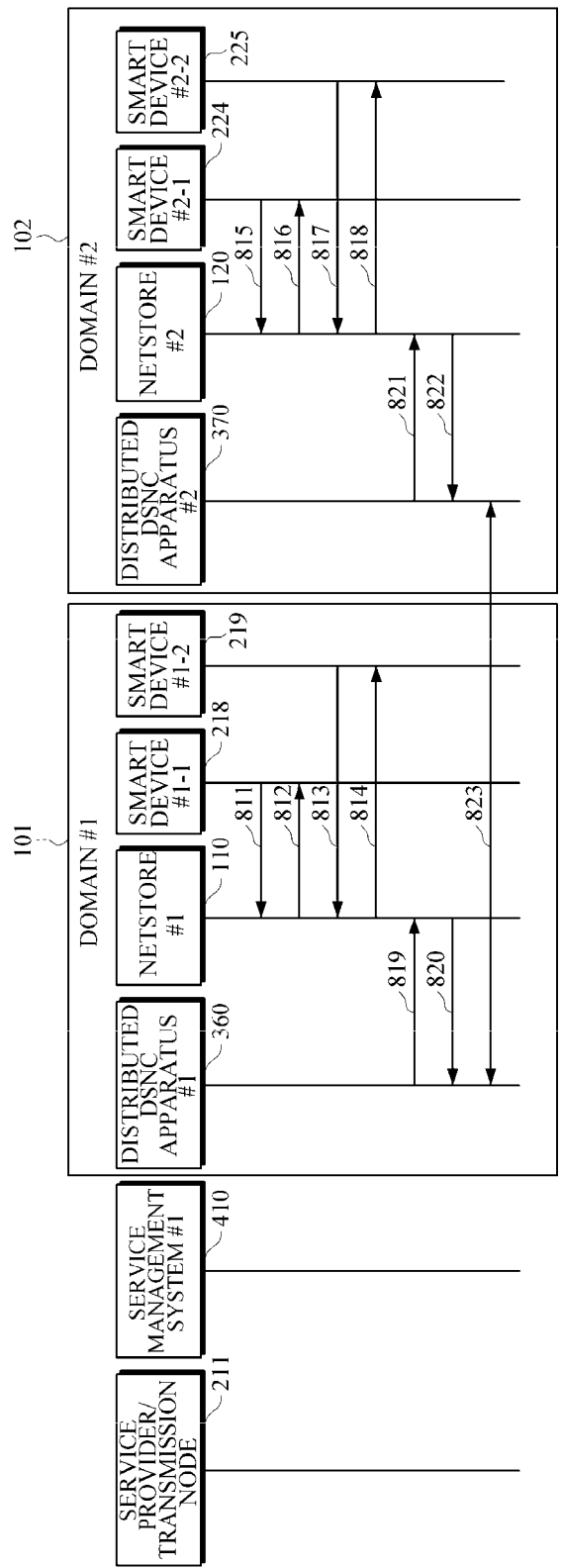
FIGS. 8A and 8B are diagrams illustrating an example of procedures of controlling DSNC apparatuses and netstores in different domains in a distributed manner as shown in FIG. 3.
Figure 8B:
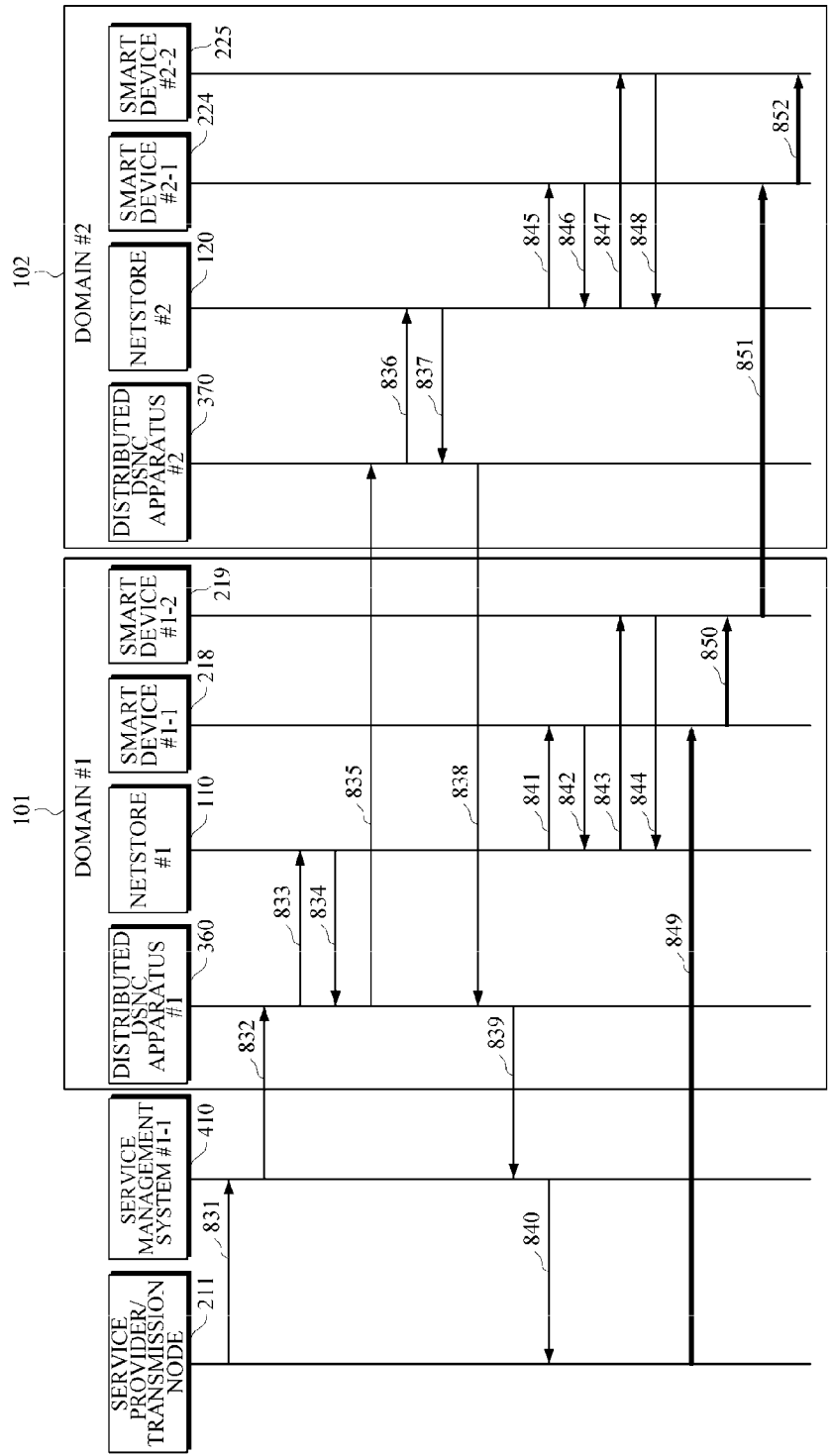

FIGS. 8A and 8B are diagrams illustrating an example of procedures of controlling DSNC apparatuses and netstores in different domains in a distributed manner as shown in FIG. 3.

Referring to FIGS. 8A and 8B, some service management systems, for example, service is management system #1-1 410, is connected to the distributed DSNC apparatus 360. Other service management system may be connected to distributed DSNC apparatus #2 370. In the example illustrated in FIG. 8A, the distributed DSNC apparatuses 360 and 370 in the respective domains exchange topology and resource information with each other by flooding without a central DSNC apparatus, as shown in the example illustrated in FIG. 3, thereby identifying the overall network topology and resource status.

Netstore #1 110 receives resource registration requests from the smart devices 218 and 219 in domain #1 101 (811 and 813), and transmits a response to the request (812 and 814). Netstore #2 120 receives resource registration requests from the smart devices 224 and 225 in domain #2 102 (815 and 817), and transmits a response to the request (816 and 818).

Distributed DSNC apparatus #1 360 requests netstore #1 110 to transmit network resource information of domain #1 101 (819), and netstore #1 110 transmits a resource information response to distributed DSNC apparatus #1 360 (820). Distributed DSNC apparatus #2 370 requests netstore #2 120 to transmit resource information (821), and netstore #2 120 transmits a resource information response to distributed DSNC apparatus #2 370 (822).

Distributed DSNC apparatus #1 360 may collect resource information from the smart devices 217 and 218 in domain #1 360 and generate topology information of the smart devices 217 and 218, as network resource providers in domain #1 101. Distributed DSNC apparatus #2 370 may generate topology information of the smart devices 224 and 225 as network resource providers in domain #2 based on resource information collected from the smart devices 224 and 225 in domain #2 102.

Distributed DSNC apparatus #1 360 and distributed DSNC apparatus #2 370 achieve network resource information and topology information of another domain by exchanging each other's topology information and the resource information (823). In this example, after is processing, for example, abstracting or simplifying, the topology and resource information of domain #1 101 in accordance with the policies of distributed DSNC apparatus #1 360, distributed DSNC apparatus #1 360 may flood the processed information to neighboring distributed DSNC apparatus #2 370. Distributed DSNC apparatus #1 360 may regularly repeat the transmission of the received topology and resource information and its topology and resource information to other distributed DSNC apparatuses, and can thereby identify topology information and resource information of the overall network over time. In the same manner as distributed DSNC apparatus #1 360, distributed DSNC apparatus #2 370 may also identify topology information and resource information of the overall network.

FIG. 8B illustrates procedures of configuring a service network using distributed DSNC apparatuses 360 and 370.

In response to the service provider 211 requesting scheduled service registration, service management system #1-1 410 transmits a dynamic network configuration request to distributed DSNC apparatus #1 360 (832). Distributed DSNC apparatus #1 360 may dynamically configure a service network for providing a scheduled service by using the network resource information and topology information of another domain being acquired in operation 823 and the network resource information and topology information of domain #1 101 to which distributed DSNC apparatus #1 360 itself is belonging.

Distributed DSNC apparatus #1 360 transmits a resource information request to netstore #1 110 to provide a service network being formed by the network resources of domain #1 101 (833), and receives a resource information response from netstore #1 110 (834).

When network resources of domain #2 102 is requested to provide a configured service network, distributed DSNC apparatus #1 360 transmits a dynamic partial network configuration is request to distributed DSNC apparatus #2 370 (835). In response to the received dynamic partial network configuration request, distributed DSNC apparatus #2 370 configures a partial service network using network resources provided by domain #2 102 for the service network created by distributed DSNC apparatus #1 360, transmits a resource reservation request to netstore #2 102 (836), and receives a resource reservation response (837).

Distributed DSNC apparatus #2 370 transmits a dynamic partial network configuration response to distributed DSNC apparatus #1 360 (838). Although the example assumes herein that two distributed DSNC apparatuses are present, more than two DSNC apparatuses may be provided through service network configuration so as to use network resources of more domains. When a final service network is configured, a partial service network response may be transmitted to distributed DSNC apparatus #1 360 at the entry of the network, passing through a number of distributed DSNC apparatuses.

Distributed DSNC apparatus #1 360 may transmit a dynamic network configuration response to service management system #1-1 410 to notify that the service network is formed over domain #1 and domain #2 (839). Service management system #1-1 410 transmits a service reservation registration response to the service provider 211 (840).

Then, at a scheduled time, netstore #1 110 in domain #1 102 and netstore #2 120 in domain #2 102 request the smart devices 218 and 219 and 224 and 225 to allocate resources so as for the service provider 211 to provide the service (841, 843, 845, and 847), and the smart devices 218, 219, 224, and 225 allocate reserved network resources for the service of the service provider 211 (842, 844, 846, and 848). Then, the service provider 211 is enabled to transmit the content or data through the service network that is formed over the multiple domains at the scheduled time (849, 850, 851, and 852).

Figure 9:
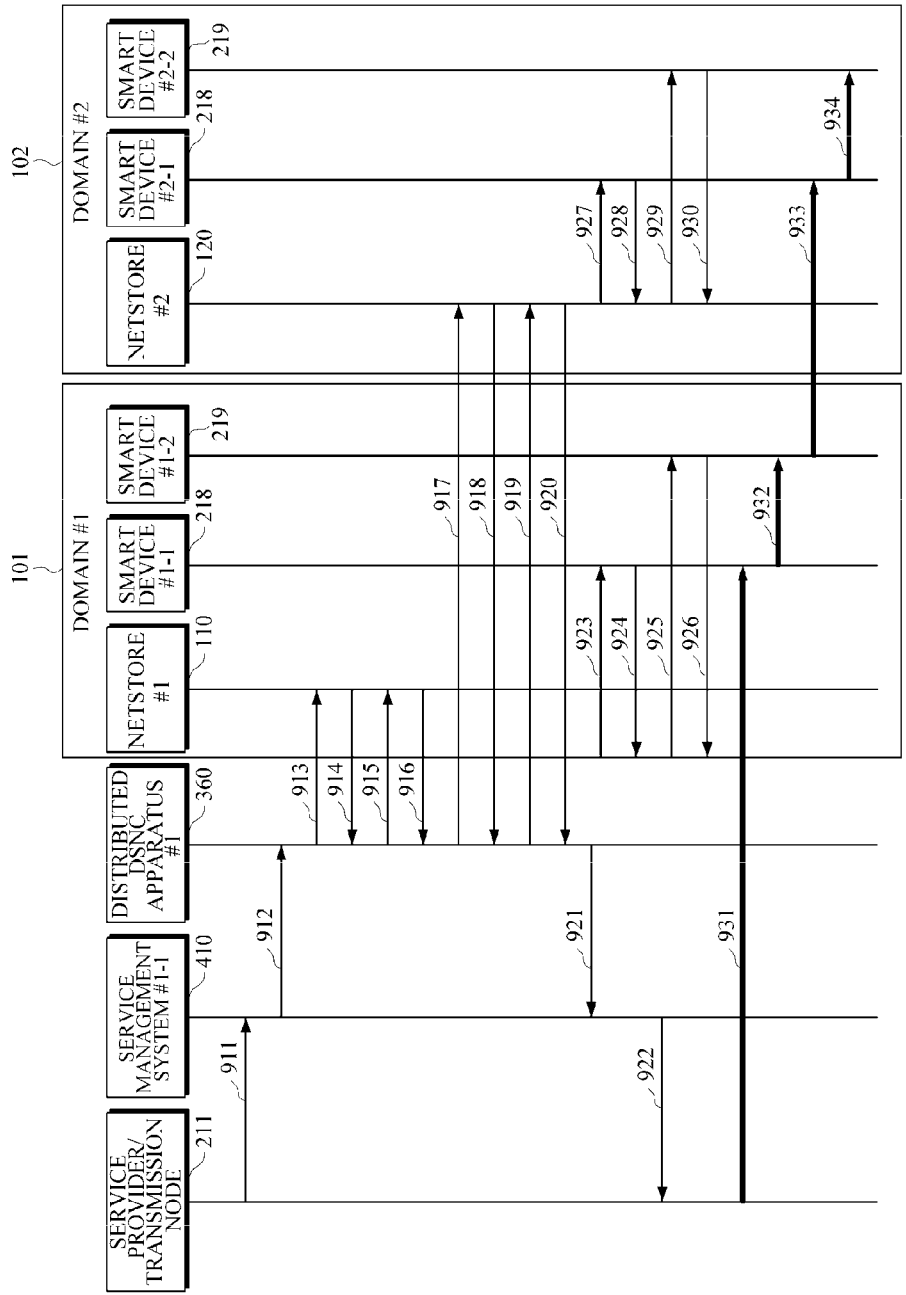
FIG. 9 is a diagram illustrating an example of procedures of one DSNC apparatus controlling multiple netstores.

FIG. 9 is a diagram illustrating an example of procedures of one DSNC apparatus is controlling multiple netstores.

although not illustrated for simplification of explanation, the example illustrated in FIG. 9 assumes that network resources of smart device #1-1 218 and smart device #1-2 218 are registered in netstore #1 110 in domain #1 101 and network resources of smart device #2-1 224 and smart device #2-2 225 are registered in netstore #2 120 in domain #2 102.

One DSNC apparatus #1 360 is configured to be functionally connected to the multiple netstores 110 and 120 in different domains. In response to the service provider 211 transmitting a service reservation registration request to service management system #1-1 410 (911), service management system #1-1 410 transmits a dynamic network configuration request to DSNC apparatus #1 360 (912).

To configure a service network in response to the dynamic network configuration request, DSNC apparatus #1 360 requests netstore #1 110 for resource information (913), and receives a resource information response from netstore #1 110 (914). In addition, DSNC apparatus #1 360 requests netstore #2 120 for resource information (917), and receives a resource information response from netstore #2 120 (918). Operations 913, 914, 917, and 918 may be performed prior to the reception of a service reservation registration request from service management system #1-1 410.

In response to the dynamic network configuration request, DSNC apparatus #1 360 may form a service network that traverses domain #1 101 and domain #2 102. To allocate resources that forms the service network, DSNC apparatus #1 360 may transmit a resource reservation request to netstore #1 110 in domain #1 101, and receives a resource reservation response from netstore #1 110 (916). In addition, DSNC apparatus #1 360 transmits the resource reservation request to netstore #2 120 in domain #2 102 (919), and receives a resource reservation response from netstore #2 120 (920).

In response to a successful response message with respect to the resource reservation request being received from each of the domains 101 and 102, DSNC apparatus #1 360 may notify service management system #1-1 410 of the completion of network configuration.

At a scheduled time, netstore #1 110 transmits a resource allocation request to each of the smart devices 218 and 219 (923 and 925), and receives a resource allocation response from each of the smart devices 218 and 219 (924 and 926). In addition, netstore #2 120 transmits a resource allocation request to each of the smart devices 224 and 225 (927 and 929), and receives a resource allocation response from each of the smart devices 224 and 225 (928 and 930). Then, the transmission node 211 is enabled to transmit the content or data at the scheduled time over a service network that is formed by the smart devices 218 and 219 in domain #1 101 and the smart devices 224 and 225 in domain #2 102 (931, 932, 933 and 934).

Figure 10:
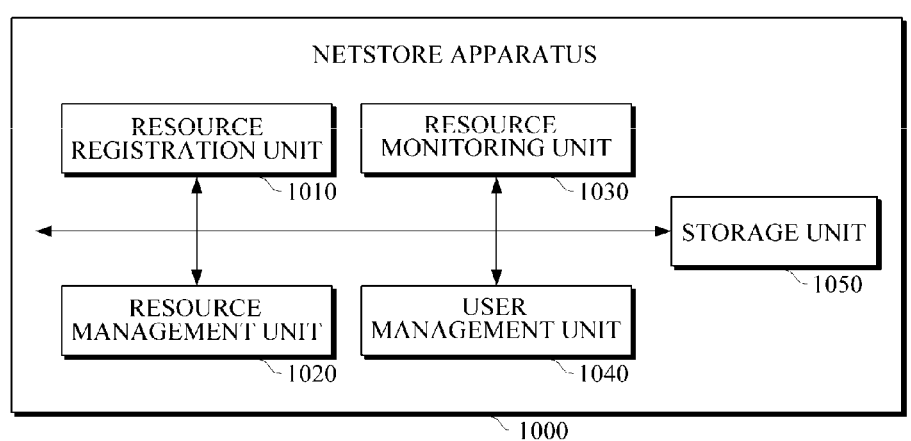
FIG. 10 is a diagram illustrating an example of a netstore apparatus.

FIG. 10 is a diagram illustrating an example of a netstore apparatus. Referring to FIG. 10, netstore apparatus 1000 may include a resource registration unit 1010, a resource management unit 1020, a resource monitoring unit 1030, a user management unit 1040, and a storage unit 1050. The netstore apparatus 1000 corresponds to the above-described netstores #1 to #4 110, 120, 130, and 140. The resource registration unit 1010, the resource management unit 1020, the resource monitoring unit 1030, the user management unit 1040, and the storage unit 1050 may be connected to one another for communications via an internal network.

The resource management unit 1010 may register network resource information, such as networking, processing, storage, and the like. In response to a request to register network resources being received from a smart device as a network resource provider, the resource management unit 1010 may verify and accept the relevant network resources. The resource is registration unit 1010 may receive information about network resources from a smart device, and register the network resources by storing and managing the network resource information in the storage unit 1050. The network resource information may include a name, classification, an URL address, and location (geographical address and latitude/longitude) of the network resource, operation information offered by the network resource, and the like.

In response to a request for information about network resources required for providing a network-based service over a service network being received from at least one dynamic service network creation apparatus, the resource management unit 1020 may look up the requested network resource information in the storage unit 1050, and provide the found network resource information to at least one dynamic service network creation apparatus. In addition, in response to receiving a request for scheduling of allocation of resources for use in the provision of a network-based service from at least one dynamic service network creation apparatus, the resource management unit 1020 may request a plurality of network resource providers to schedule resource allocation.

The resource management unit 1020 may look up the network resource information among registered network resources including networking, processing, storage, and the like. The resource management unit 1020 may list the network resource information according to the classification, a name, a provider, a location, and a status of each network resource based on the information present in the storage unit 1050. A list of the network resources found by the resource management unit 1020 and information about each network resource may be displayed in the form of a graphic user interface (GUI) or a command line interface (CLI), or stored as a file.

The resource management unit 1020 may accept or reject the request for the network resource from the dynamic service network creation apparatus on the basis of contract is information with the dynamic service network creation apparatus, netstore operation policies, or policies of the network resource provider.

In response to a request for scheduling of allocation of at least one network resource for use in the provision of a network-based service from at least one dynamic service network creation apparatus, the resource management unit 1020 may request a plurality of network resource providers to schedule resource allocation. The scheduled resource allocation request may include time information at which the network-based service is provided, and the resource management unit 1020 may request a plurality of the network resource providers to allocate network resources corresponding to the scheduled resource allocation request such that the service can be provided at the time indicated by the time information.

The resource management unit 1020 may allocate the network resources in response to requests from one or more DSNC apparatuses, store in the storage unit 1050 information about how much network resource is scheduled and allocated by each of the network resource providers (1050), and perform resource scheduling such that previously allocated resources are not used later for another service request.

The resource management unit 1020 may authenticate a network resource registration request from the smart device. In addition, the resource management unit 1020 may change network resource information and status, which has been registered in the storage unit 1010 by the resource registration unit 1010, and delete the registered network resource information from the storage unit 1010.

The resource monitoring unit 1030 may monitor the registered network resources. The resource monitoring unit 1030 may receive status information of the registered network resources from the smart device, and maintain the received status information to monitor the registered network resources. The status information of the registered network resources may is include an operation state (active/inactive) of the network resources, CPU usage rate, network usage rate, user information of the smart device, and the like. The resource monitoring unit 1030 may display the status information of the network resources in the form of GUI or CLI, and store the status information as a file in the storage unit 1050.

In addition, the resource monitoring unit 1030 may test functions provided by the network resources of the smart device. The resource management unit 1020 may use the resource monitoring unit 1030 to transmit an SOAP-based query message to the smart device, and check whether the network resources to be registered operate normally. Moreover, the resource monitoring unit 1030 may transmit an SOAP-based query message to one smart device to measure communication delay and bandwidth information with respect to another smart device that provides a different network resource, and display a measurement result. A result of testing the functions may be stored in the storage unit 1050.

The user management unit 1040 may perform management process, such as registration, modification, deletion, and authentication, with respect to information about a user of a netstore 110, that is, a user of the smart device as a network resource provider and the dynamic service network creation apparatus.

The storage unit 1050 may store data, programs, and the like, which is required for operating the netstore 110. The storage unit 1050 may store the network resource information, the network resource status information, the function test result, user information of the network resource, and the like, and configure the information to be searchable.

The resource registration unit 1010 may allow multiple smart devices to register resources, and include control management function and protocol that supports a variety of smart devices so as to control the multiple smart devices. The protocol may include at least one of Simple Network Management Protocol (SNMP), General Switch Management Protocol is (GSMP), Common Open Policy Service (COPS), Simple Object Access Protocol (SOAP), TR-069 (Technical Report 069), and diameter protocol.

Figure 11:
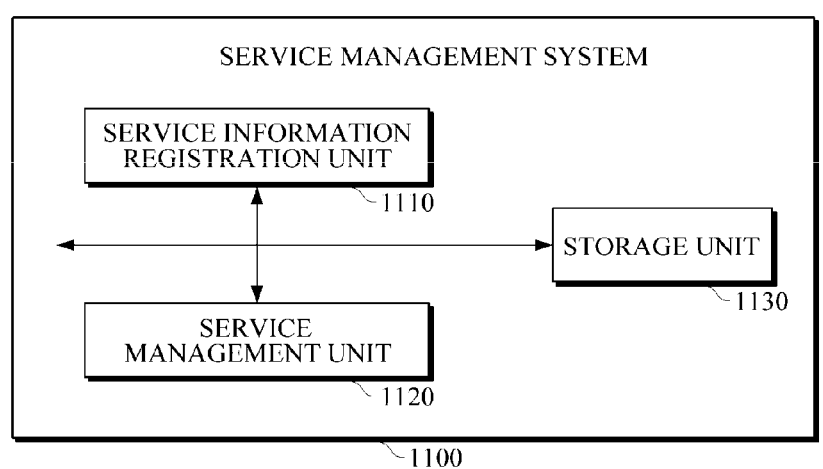
FIG. 11 is a diagram illustrating an example of a service management system.

FIG. 11 is a diagram illustrating an example of a service management system. Referring to FIG. 11, service management system 1100 may include a service information registration unit 1110, a service management unit 1120, and a storage unit 1130.

The service information registration unit 1110 may be connected to a transmission node as a service provider that offers a network-based service, such as, IPTV, a social network service, VoIP, VoD, and the like, using a netstore-based dynamic service network creation function. Thus, the transmission node may access a dynamic service network creation apparatus through the service information registration unit 1110, and input service information to be offered. The service information registration unit 1110 may register the input service information and store the information in the storage unit 1130.

The service management unit 1120 may use the dynamic service network creation apparatus to manage information about a service that is scheduled in the transmission node, which is a service provider, or a program currently being provided. In addition, the service management unit 1120 may be configured to be connected to the transmission node. The transmission node may acquire service information through the service management unit 1120 in the service management system 1100, and select desired real-time broadcast channel or VoD content from the service information. A reception node may acquire service information from an application store that provides applications including service information. The service management unit 1120 may perform necessary processing in association with the dynamic service network creation apparatus so as to provide a service over the configured service network.

For example, the service management unit 1120 may transmit a service reception request is from the reception node to the dynamic service network creation apparatus, and the dynamic service network creation apparatus may acquire network resource information required for providing a request service to the reception node, and form the service network using the acquired network resource information so as to provide the requested program service over the service network.

Moreover, the service management unit 1120 may manage user profile information of the service provider and the service user. The service profile information may include a user and specifications of the smart device as a service provider, information about the service provided, a user and specifications of the smart device as a service user, and display capability.

Figure 12:
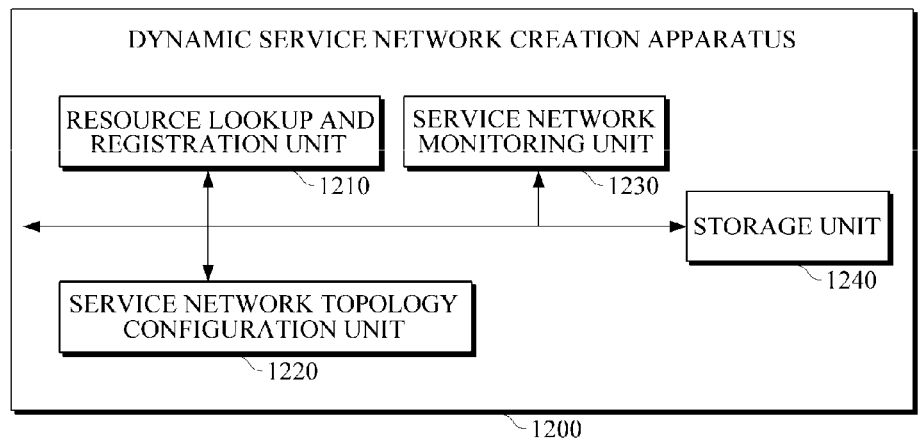
FIG. 12 is a diagram illustrating an example of a dynamic service network creation apparatus.

FIG. 12 is a diagram illustrating an example of a dynamic service network creation apparatus. Referring to FIG. 12, dynamic service network creation apparatus 1200 may include a resource lookup and registration unit 1210, a service network topology configuration unit 1220, a service network monitoring unit 1230, and a storage unit 1240. The resource lookup and registration unit 1210, the service network topology configuration unit 1220, the service network monitoring unit 1230, and the storage unit 1240 may be connected to one another for data transmission/reception. The dynamic service network creation apparatus 1200 corresponds to the above-described DSCN devices.

The resource lookup and registration unit 1210 may acquire information about network resources by requesting the netstore 1100 for the network resources, such as networking, processing, and storage, which are required for providing an overlay network-based service to be provided by a transmission node as a service provider. In addition, the resource lookup and registration unit 1210 may request the netstore 1100 for permission for use of the network resources being required for providing the network-based service.

In response to an authentication of the use of the requested network resource being received from the netstore 1100, the resource lookup and registration unit 1210 may dynamically configure a service network as an optimal path from the transmission node to a reception node using the appropriate network resources. The service network topology configuration unit 1220 may configure an optimal overlay network considering the status of the overlay network resources and terminal specifications of the reception node as a service user.

In addition, the service network topology configuration unit 1220 may transmit overlay network configuration information including overlay network-based service transmission path, internal parameter configuration setting information, and the like. For example, the service network topology configuration unit 1220 may provide the smart devices present on a service transmission path with addresses of a preceding node, from which service data has been transmitted for the overlay network-based service, and of a next node, to which the service data is to be output, and setting information of an operation to be executed by a corresponding smart device. Furthermore, the service network topology configuration unit 1220 may transmit information about the formed overlay network configuration to the service provider and the service user.

If the resource lookup and registration unit 1210 receives a rejection of the request for the network resource from the netstore 1100, the resource lookup and registration unit 1210 may transmit a response message, through the service management system 1100 as shown in FIG. 11, to the transmission node as a service provider so as to notify that the service cannot be provided.

If the dynamic service network creation apparatus 1200 is a central dynamic service network creation apparatus as described above with reference to FIGS. 2, 7A, and 7B, the dynamic service network creation apparatus 1200 may receive dynamic network configuration requests occurring on the network in a centralized manner. In this example, the service is network topology configuration unit 1220 may receive network resource information of each domain and topology information about configuration between the network resources from each local dynamic service network creation apparatus in each domain and identify the overall network configuration. The local dynamic service network creation apparatus creates a local dynamic network. In addition, in response to a service reservation request being received from the service management system, the service network topology configuration unit 1220 may select at least one local dynamic service network creation apparatus that is appropriate to configure a service network. Then, the service network topology configuration unit 1220 may request the at least one selected local dynamic service network creation apparatus to configure a local service network in a domain which is managed by the selected local dynamic service network creation apparatus. The configured local service network constitutes the enter service network.

If the dynamic service network creation apparatus 1200 is a distributed dynamic service network creation apparatus that is present in each of multiple domains in a network, as described above with reference to FIGS. 3, 8A, and 8B, the dynamic service network creation apparatus 1200 may receive the service reservation request for the domain to which the dynamic service network creation apparatus 1200 is belonging. In this example, the service network topology configuration unit 1220 may receive network resource information of a different domain and topology information about the configuration between the network resources from another distributed dynamic service network creation apparatus belonging to the different domain. In addition, the service network topology configuration unit 1220 may transmit network resource information of the domain, to which the dynamic service network creation apparatus 1200 is belonging, and topology information about configuration between the network resources to the other distributed dynamic service network creation apparatus. By is exchanging the network resource information and the topology information, the service network topology configuration unit 1220 is enabled to identify the network resources and topology of the entire network. In addition, if the service network topology configuration unit 1220 requires network resources in another domain being managed by a different distributed dynamic service network creation apparatus so as to provide the network-based service in response to the service reservation request, the service network topology configuration unit 1220 may request to dynamically configure a partial service network that includes network resources required for the different distributed dynamic service network creation apparatus.

In response to a notification of the occurrence of an error in a network resource constituting a service network being received from the netstore, the service network topology configuration unit 1220 may transmit the notification to the service management system, and request and acquire a network resource that substitutes for the network resource having the error in response to a service network recreation request from the service management system. Then, the service network topology configuration unit 1220 may reconfigure the service network using the acquired network resource.

The service network monitoring unit 1230 may collect status information of a service being provided over the service network configured by the service network topology configuration unit 1220 and status information of network resources, and provide the collected status information to the service provider in the form of GUI or CLI or as a file through the service management system 1100. The provided state information may include copies of videos or audio being transmitted from each node, quality measurements of video or audio currently being transmitted, a service error state such as discontinuity of video or audio, and information of an user receiving a service. The status information of the network resource may include activation or deactivation of the network resource, a CPU usage rate, or a network is usage rate.

In addition, the service network topology configuration unit 1220 may allow or refuse the access to multiple service management system, and perform general user management, for example, account generation, deletion, maintenance and modification.

The storage unit 1240 may store and manage the information that is retained by the dynamic service network creation apparatus 1200. The storage unit 1240 may store and manage the resource lookup and registration information, which is obtained by the resource lookup and registration unit 1210, the service network topology and the network resource information for configuring the service network topology, which are configured by the service network topology configuration unit 1220, and service state information and status information of network resources in a service network.

As described above, the dynamic service network creation system capable of managing smart device resources based on a netstore allows terminal manufacturers or content providers to register various applications through an app store and Android® market, and allows users to download the applications to their smart phones or smart TVs and install and use the applications. Accordingly, in an environment where the content generation, transmission, and consumption are actively conducted, the content and data can be allocated and processed through interworking between the smart devices and a cloud server based on a netstore, without the intervention of an internet service provider (ISP).

In addition, in response to a request from a service management system, multiple netstores, each of which manages a corresponding domain and a provider network, and DSNC apparatuses are controlled to be associated with each other in a centralized or distributed manner, so that content and data can be transmitted and processed among the smart devices that is are widely distributed over multiple domains or multiple service provider networks.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A dynamic service network creation apparatus comprising:
   a resource lookup and registration unit configured to look up and register network resource information on network resources of each of a plurality of network resource providers which are managed by a netstore apparatus; and
   a service network topology configuration unit configured to, in response to a service reservation request being received from each of a plurality of service providers through a service management system, dynamically configure, using the network resource information, a service network for providing a network-based service from the service provider to a service user that is to use the network-based service of the service provider,
   wherein the dynamic service network creation apparatus is connected to the service management system that manages the network-based service provided by the plurality of service providers and the netstore apparatus that is present in each of multiple domains and manages the network resources of the plurality of network resource providers, each domain indicating a service management area, wherein the plurality of network resource providers register the network resources in the netstore apparatus through a netstore application installed therein, and the netstore apparatus controls the plurality of network resource providers through the netstore application to manage the registered network resources of the plurality of network resource providers, and wherein, when the dynamic service network creation apparatus is a first distributed dynamic service network creation apparatus to receive a service reservation request of a first domain to which the dynamic service network creation apparatus belongs, the service network topology configuration unit receives network resource information of a second domain and topology information about a configuration between network resources from a second distributed dynamic service network creation apparatus belonging to the second domain, transmits, to the second distributed dynamic service network creation apparatus, network resource information of the first domain to which the dynamic service network creation apparatus belongs and topology information about a configuration between network resources of the first domain, and, if a network resource of the second domain is required to be used to configure the service network, requests the second distributed dynamic service network creation apparatus to dynamically configure a partial service network using the required network resource.

2. The dynamic service network creation apparatus of claim 1, wherein the dynamic service network creation apparatus is a central dynamic service network creation apparatus which receives dynamic network configuration requests occurring on a network in a centralized manner, and wherein the service network topology configuration unit identifies an overall network configuration by receiving network resource information of a domain and topology information about configuration between network resources from at least one local dynamic network service configuration apparatus which manages the domain and dynamically configures a local dynamic service network in the domain.

3. The dynamic service network creation apparatus of claim 2, wherein in response to a service reservation request being received from the service management system, the service network topology configuration unit selects at least one local dynamic service network creation apparatus that dynamically configures a service network and requests the selected at least one local dynamic service network creation apparatus to configure a local service network within a domain that is managed by the selected at least one local dynamic service network creation apparatus, the local service network constituting the service network.

4. The dynamic service network creation apparatus of claim 1, wherein the service network topology configuration unit requests a different dynamic service network to dynamically configure a partial network using network resources required for the second domain when the network resource of the second domain that is managed by the second distributed dynamic service network creation apparatus is required to provide the network-based service in response to the service reservation request.

5. The dynamic service network creation apparatus of claim 1, wherein in response to a message being received from the netstore apparatus to notify of the occurrence of an error in a network resource that constitutes the service network, the service network topology configuration unit transmits the message to the service management system, requests and acquires a network resource that substitutes for the network resource having the error from the netstore apparatus in response to a service network recreation request from the service management system, and reconfigures a service network using the acquired network resource.

6. A netstore apparatus comprising:
a resource registration unit configured to register network resource information provided from each of a plurality of network resource providers;
a storage unit configured to store the registered network resource information; and
a resource management unit configured to manage the network resource information provided from each of the plurality of network resource providers,
wherein the resource management unit is configured to, in response to a request for network resource information required for providing a network-based service over a service network from a dynamic service network creation apparatus, look up the requested network resource information in the storage unit, provide the found network resource information to the dynamic service network creation apparatus, and issue a resource allocation reservation request to the plurality of network resource providers in response to a request for scheduled allocation of at least one network resource for use in providing the network-based service being received from the dynamic service network creation apparatus,
wherein the netstore apparatus is connected to the plurality of network resource providers in a first domain, which indicates a service management area, and the dynamic service network creation apparatus which dynamically configures the service network and belongs to the first domain,
wherein the plurality of network resource providers register the network resource information in the netstore apparatus through a netstore application installed therein, and the netstore apparatus controls the plurality of network resource providers through the netstore application to manage network resources of the plurality of network resource providers, and
wherein the dynamic service network creation apparatus is a first dynamic service network creation apparatus that receives network resource information of a second domain and topology information about a configuration between network resources from a second dynamic service network creation apparatus belonging to the second domain, transmits, to the second dynamic service network creation apparatus, network resource information of the first domain to which the dynamic service network creation apparatus belongs and topology information about a configuration between network resources of the first domain, and, if a network resource of the second domain is required to be used to configure the service network, requests the second dynamic service network creation apparatus to dynamically configure a partial service network using the required network resource.

7. The netstore apparatus of claim 6, wherein the resource registration unit receives resource registration from a plurality of smart devices as the network resource providers and includes a control management function and protocol that supports a variety of types of smart devices so as to control the plurality of smart devices.

8. The netstore apparatus of claim 7, wherein the protocol includes at least one of a simple network management protocol (SNMP), a general switch management protocol (GSMP), a common open policy service (COPS), a simple object access protocol (SOAP), technical report 069 (TR-069), and a diameter protocol.

9. The netstore apparatus of claim 6, wherein the resource allocation reservation request includes time information at which the network-based service is provided and the resource management unit requests the plurality of network resource providers to allocate network resources corresponding to the resource allocation reservation request such that the network-based service can be provided based on the time information.

10. The netstore apparatus of claim 6, wherein in allocating the network resources in response to a request from the dynamic service network creation apparatus, the resource management unit stores information about how much amount of network resources of each network resource provider is scheduled or allocated to a service requested by which service management system, and performs resource scheduling based on the stored information such that network resources already having been allocated are not used later for a different service request.

11. The netstore apparatus of claim 6, further comprising:
a resource monitoring unit configured to monitor status information of network resources registered in the resource registration unit.

12. A method of dynamically configuring a service network of a system which includes a netstore apparatus to manage network resources registered by a plurality of network resource providers, a service management system to manage a network-based service registered by a plurality of service providers, and a dynamic service network creation apparatus to dynamically configure a service network in an overlay networking scheme by using the network resources registered in the netstore apparatus in response to a dynamic service network configuration request from the service management system, the method comprising:
identifying, by multiple local dynamic service network creation apparatuses, an overall network configuration by receiving network resource information of multiple domains, which are managed by the multiple local dynamic service network creation apparatuses, respectively, and topology information about a configuration between network resources from the local dynamic service network creation apparatuses each of which dynamically configures a local service network in each of the multiple domains;
in response to a service reservation request from the service management system, selecting at least one of the local dynamic service network creation apparatuses suitable to dynamically configure the service network according to the service reservation request; and
in order to configure the service network, requesting the selected at least one local dynamic service network creation apparatus to configure a local service network in a domain that is managed by the selected local dynamic service network creation apparatus,
wherein each of the multiple domains includes a netstore apparatus and a plurality of network resource providers, and
wherein the plurality of network resource providers register the network resources in the netstore apparatus through a netstore application installed therein, and the netstore apparatus controls the plurality of network resource providers through the netstore application to manage the registered network resources of the plurality of network resource providers.

13. The method of claim 12, further comprising:
receiving a local service network configuration response including information about the local service network configuration from the selected local dynamic service network creation apparatus; and
configuring the service network based on the local service network configuration response.

14. A method of dynamically configuring a service network of a system which includes a netstore apparatus to manage network resources registered by a plurality of network resource providers, a service management system to manage a network-based service registered by a plurality of service providers, and a first dynamic service network creation apparatus to dynamically configure a service network in an overlay networking scheme by using the network resources registered in the netstore apparatus in response to a dynamic service network configuration request from the service management system, the method comprising:
receiving network resource information of a second domain to which the first dynamic service network creation apparatus does not belong and topology information about a configuration between network resources of the second domain from a second dynamic service network creation apparatus belonging to the second domain;
transmitting network resource information of a first domain to which the first dynamic service network creation apparatus belongs and topology information about a configuration between network resources of the first domain to the second dynamic service network creation apparatus; and
if a network resource of the second domain is required to be used to configure the service network, requesting the second dynamic service network creation apparatus to dynamically configure a partial service network using the required network resource,
wherein each of the first and second domains includes a netstore apparatus and a plurality of network resource providers, and
wherein the plurality of network resource providers register the network resources in the netstore apparatus through a netstore application installed therein, and the netstore apparatus controls the plurality of network resource providers through the netstore application to manage the registered network resources of the plurality of network resource providers.

15. The method of claim 14, further comprising:
receiving a partial service network configuration response including information about the partial service network configuration from the second dynamic service network creation apparatus; and
configuring the service network using the partial service network configuration response.

* * * * *